United States Patent
Pai et al.

(10) Patent No.: US 12,448,849 B2
(45) Date of Patent: Oct. 21, 2025

(54) POWER DELIVERY SYSTEM FOR PULSED POWER DRILLING

(71) Applicant: Halliburton Energy Services, Inc, Houston, TX (US)

(72) Inventors: Nagaraja K. Pai, Houston, TX (US); Boguslaw Wiecek, Houston, TX (US); Ana Beatriz Martins Aguiar, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/359,761

(22) Filed: Jul. 26, 2023

(65) Prior Publication Data

US 2025/0034946 A1    Jan. 30, 2025

(51) Int. Cl.
*E21B 7/15*    (2006.01)
*E21B 17/02*    (2006.01)
*E21B 41/00*    (2006.01)

(52) U.S. Cl.
CPC .............. *E21B 7/15* (2013.01); *E21B 17/023* (2013.01); *E21B 17/028* (2013.01); *E21B 41/0085* (2013.01)

(58) Field of Classification Search
CPC ........................................................ E21B 7/15
See application file for complete search history.

(56) References Cited

U.S. PATENT DOCUMENTS

| | | | |
|---|---|---|---|
| 8,186,454 | B2 | 5/2012 | Moeny |
| 9,896,912 | B2 | 2/2018 | Tegeler et al. |
| 11,280,171 | B2 | 3/2022 | Pai |
| 11,326,399 | B2 | 5/2022 | Gleitman et al. |
| 11,657,965 | B2 | 5/2023 | Wiecek et al. |
| 11,680,447 | B2 | 6/2023 | Pai et al. |

(Continued)

FOREIGN PATENT DOCUMENTS

| | | |
|---|---|---|
| CA | 3231158 | 5/2023 |
| CA | 3232370 | 5/2023 |

(Continued)

OTHER PUBLICATIONS

"U.S. Appl. No. 17/982,589, Non-Final Office Action", filed Dec. 29, 2023, 12 pages.

(Continued)

*Primary Examiner* — Giovanna Wright
(74) *Attorney, Agent, or Firm* — DeLizio, Peacock, Lewin & Guerra LLP

(57) ABSTRACT

Some implementations include a system comprising at least one coiled tubing extending from a surface of a wellbore to a bottomhole assembly (BHA); a power cable to be housed either inside or outside the at least one coiled tubing and to electrically couple a power supply at the surface of the wellbore with the BHA. The BHA comprises at least one capacitor to store electrical power received from the power supply via the power cable housed in the at least one coiled tubing; and at least one electrode electrically coupled to the at least one capacitor to receive the stored electrical power from the at least one capacitor and to periodically emit pulsed power discharges into a subsurface formation to drill the wellbore based on the stored electrical power received from the at least one capacitor.

20 Claims, 18 Drawing Sheets

(56) References Cited

U.S. PATENT DOCUMENTS

| | | |
|---|---|---|
| 11,970,923 B2 | 4/2024 | Aguiar et al. |
| 12,104,466 B2 | 10/2024 | Finke et al. |
| 2006/0037779 A1 | 2/2006 | Moeny et al. |
| 2006/0038437 A1* | 2/2006 | Moeny ............... H01B 3/20 299/14 |
| 2007/0137893 A1 | 6/2007 | Moeny et al. |
| 2007/0194759 A1* | 8/2007 | Shimizu ............... H02J 7/345 320/166 |
| 2008/0185184 A1 | 8/2008 | Maguire |
| 2008/0245568 A1 | 10/2008 | Jeffryes |
| 2011/0275521 A1 | 11/2011 | Stemmle et al. |
| 2014/0131044 A1 | 5/2014 | Parsche |
| 2016/0326806 A1 | 11/2016 | Lund et al. |
| 2018/0148981 A1 | 5/2018 | Moeny |
| 2018/0287533 A1 | 10/2018 | Rajagopalan |
| 2019/0316419 A1 | 10/2019 | Bayol et al. |
| 2020/0370375 A1 | 11/2020 | Gleitman et al. |
| 2021/0025240 A1 | 1/2021 | Moeny |
| 2021/0324683 A1 | 10/2021 | Gleitman et al. |
| 2022/0195806 A1* | 6/2022 | Pai ............... H02M 1/0077 |
| 2022/0195866 A1* | 6/2022 | Sedano ............... E21B 7/15 |
| 2023/0132937 A1 | 5/2023 | Finke et al. |
| 2023/0143504 A1 | 5/2023 | Finke et al. |
| 2023/0144083 A1 | 5/2023 | Finke et al. |
| 2023/0144439 A1 | 5/2023 | Finke et al. |
| 2023/0145343 A1 | 5/2023 | Finke et al. |

FOREIGN PATENT DOCUMENTS

| | | |
|---|---|---|
| CN | 111119739 | 5/2020 |
| EP | 0497420 | 8/1992 |
| EP | 3508683 | 11/2020 |
| EP | 3739163 | 11/2020 |
| WO | 2005124213 | 12/2005 |
| WO | 2014145259 | 9/2014 |
| WO | 2019245544 | 12/2019 |
| WO | 2020236189 | 11/2020 |
| WO | 2022140719 | 6/2022 |
| WO | 2023086841 | 5/2023 |
| WO | 2023086844 | 5/2023 |
| WO | 2023086845 | 5/2023 |
| WO | 2023086846 | 5/2023 |

OTHER PUBLICATIONS

"PCT Application No. PCT/US2023/071164, International Search Report and Written Opinion", Apr. 18, 2024, 13 pages.

"PCT Application No. PCT/US2022/079577, International Search Report and Written Opinion", Mar. 9, 2023, 11 pages.

"PCT Application No. PCT/US2022/079580, International Search Report and Written Opinion", Mar. 15, 2023, 14 pages.

"PCT Application No. PCT/US2022/079581, International Search Report and Written Opinion", Mar. 15, 2023, 12 pages.

"PCT Application No. PCT/US2022/079583, International Search Report and Written Opinion", Mar. 10, 2023, 12 pages.

"PCT Application No. PCT/US2022/079580, International Preliminary Report on Patentability", May 23, 2024, 8 pages.

"PCT Application No. PCT/US2022/079581, International Preliminary Report on Patentability", May 23, 2024, 6 pages.

"PCT Application No. PCT/US2022/079583, International Preliminary Report on Patentability", May 23, 2024, 7 pages.

"U.S. Appl. No. 17/982,739, Final Office Action", filed Jun. 12, 2024, 10 pages.

"U.S. Appl. No. 17/982,739, Non-Final Office Action", filed Dec. 14, 2023, 10 pages.

"U.S. Appl. No. 17/982,789, Non-Final Office Action", filed Dec. 22, 2023, 7 pages.

Paramane, et al., "A Review on Insulation and Dielectrics for High-Temperature Superconducting Cables for Power Distribution: Progress, Challenges, and Prospects", IEEE Transactions on Applied Superconductivity, vol. 33, No. 6, Sep. 2023, Sep. 2023, 31 pages.

"Extended European Search Report for 22893818.9", Feb. 3, 2025, 9 pages.

"PCT Application No. PCT/US2024/054615 International Search Report and Written Opinion", Mar. 20, 2025, 10 pages.

\* cited by examiner

POWER DELIVERY SYSTEM FOR PULSED POWER DRILLING

BACKGROUND

Conventional drilling operations using a traditional drill bit to mechanically drill the wellbore into a subsurface formation. In contrast, electrocrushing drilling uses pulsed power technology to drill the wellbore. Pulsed power technology repeatedly applies a high electric potential across the electrodes of an electrocrushing drill bit, which ultimately causes the surrounding rock to fracture. The fractured rock is carried away from the bit by drilling fluid and the bit advances downhole. However, the amount of power required to be supplied downhole for pulsed power drilling is significant.

In conventional drilling operations, fixed length drill pipes are used to carry drilling fluid to a bottom-hole assembly (BHA). Inserting high power cables for delivery of the amount of power needed for pulsed power operations into these type of drill pipes may not be feasible. Hence, in this configuration with the drill pipes, electrical power to use during a drilling operation may only be generated from downhole fluid flow under pressure, and drilling using the fixed length pipe configuration is restricted to mechanical drilling (i.e., turning a drilling bit to shave away rock). When this configuration is used for pulsed power drilling operations, electrical power is required and has to be generated downhole which may limit how much power is able to be generated and utilized. While depicted as larger than the coiled tubing 102, the BHA 150 and coiled tubing 102 may have similar diameters, and components of the BHA 150 are enlarged to show detail.

Downhole power requirements for a pulsed power drilling may be exacerbated by the generally poor power conversion efficiencies (<50%) of downhole power generation and power conditioning. For example, total heat losses up to 250 kilowatts (kW) in the stages leading to discharging power via a pulsed power tool (e.g., an electro-crushing drill bit) may lead to difficulties in thermal management. The heat losses may be imparted as extra energy into the drilling fluid. The excess energy (heat) may need to be counteracted by newly-circulated drilling fluid, and the excess heat may have to be carried back to the surface by the drilling fluid.

BRIEF DESCRIPTION OF THE DRAWINGS

Implementations of the disclosure may be better understood by referencing the accompanying drawings.

DESCRIPTION OF IMPLEMENTATIONS

Figure 1:
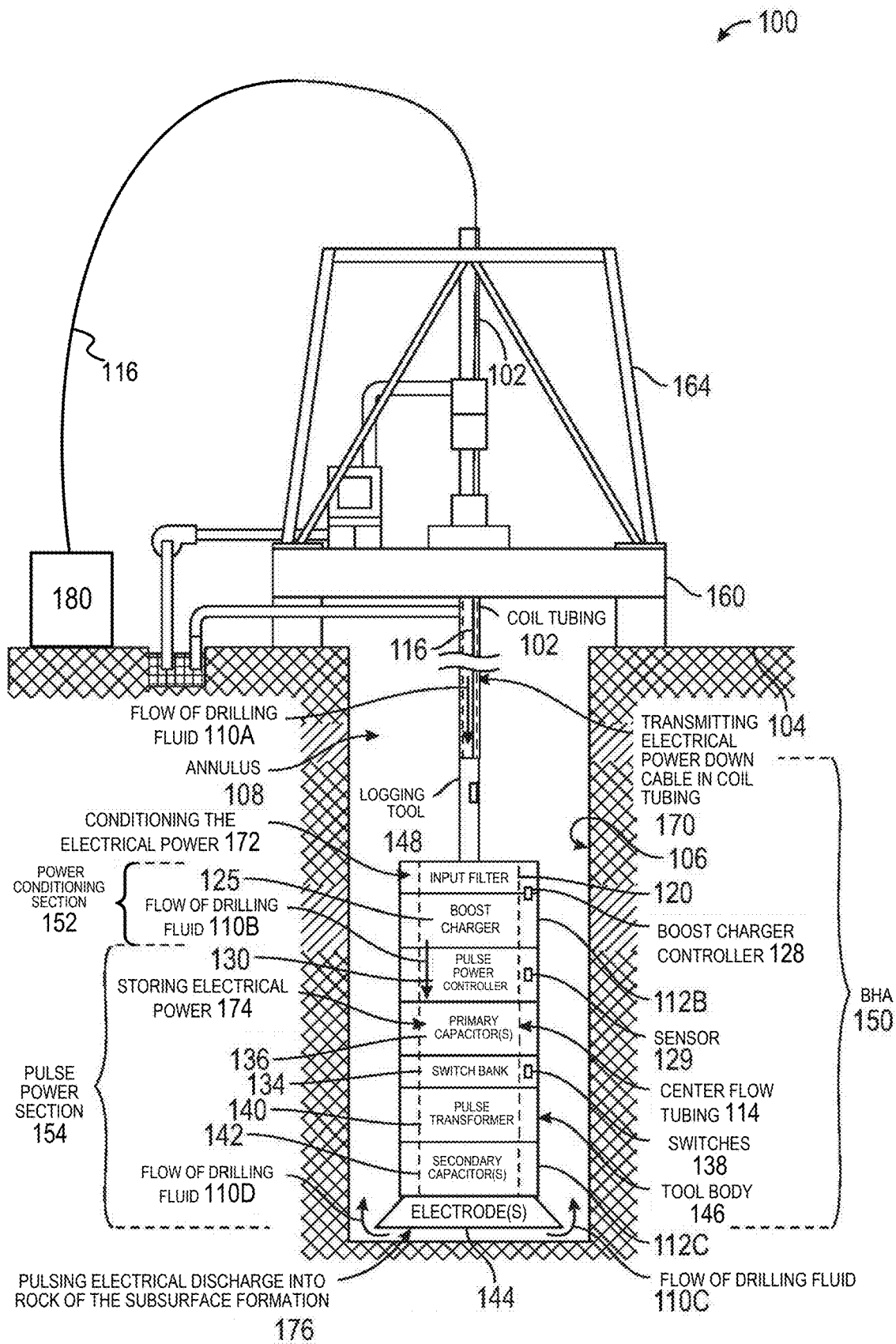
FIG. 1 is a schematic diagram depicting an example coiled tubing pulsed power drilling assembly, according to some implementations.

The description that follows includes example systems, methods, techniques, and program flows that embody implementations of the disclosure. However, it is understood that this disclosure may be practiced without these specific details. For instance, this disclosure refers to transmitting power to a downhole pulsed power tool via a cable integrated with coiled tubing in illustrative examples. Implementations of this disclosure may instead be applied to power generation for conventional drilling. In other instances, well-known instruction instances, protocols, structures, and techniques have not been shown in detail in order not to obfuscate the description.

Example implementations may include the use of continuous coiled tubing (instead of section drill pipes) for the delivery of the necessary power to perform pulsed power drilling operations. In the continuous coiled tubing, it may be possible to run continuous power cables and communication cables inside of the coiled tubing. In this configuration, substantial amounts of power may be generated at the surface and transmitted to the BHA via a continuous coiled tubing which makes high-power pulsed power drilling possible. Such a system may eliminate a need for a downhole power generator and a complex power conditioning unit in order to perform pulsed power drilling. Additionally, such implementations may reduce power losses and remove a need for a complex power conversion apparatus. In some implementations, a power electronics topology is also used to provide the necessary power for pulsed power drilling operations. This power electronics topology may include a multi-mode controlled surface power supply and a downhole boost charger for delivering the necessary charge for the pulsed power drilling.

Thus, example implementations may integrate a power cable with coiled tubing to form a mud flow pipe that may deliver the necessary electrical power to perform the pulsed power drilling. Additionally, example implementations may provide an efficient, impedance matched power delivery to the pulsed power drilling in the BHA. Accordingly, example implementations may enable the disruptive pulsed power drilling that is capable of drilling through hard rock subsurface formations. Such example implementations may achieve a rate of at least 60 feet per hour (ft/h) drilling of a wellbore through hard rock without multiple trips to change the traditional mechanical drill bit. Moreover, example implementations may include a cable via the coiled tubing for high speed communication between the surface and downhole.

Example implementations may include a method to deliver medium or high voltage direct current (DC) power downhole to a boost charger and a power conditioner (which in turn charges a pulsed power unit that is configured for electro-crushing drilling). In some implementations, a single cable or multi-conductor cables may be integrated in the continuous coiled tubing for delivery of power downhole. In some implementations, at least one of a fiber optic or coaxial communication cable may also be integrated in the continuous coiled tubing. Example implementations may be configured to minimize the conduction losses and total voltage drop when delivering power downhole. In some implementations, while delivering high power downhole, the cables may be properly supported in a fast-flowing drilling fluid medium. The drilling fluid may be highly vicious and under high pressure. In some implementations, the cables may be single or multi-stranded and configured to have a low inductance. In some implementations, the amount of power delivered via such cables could be as high as 1000 kilowatts (kW) and the voltage may be as high as 200 kilovolts (kV).

In some implementations, the power delivery system may include a surface component such as a high-voltage power supply. The power delivery system may also include downhole components that are part of the BHA that may include an input filter, a voltage booster, and a smart charger. In some implementations the power delivery system may boost charge a high voltage capacitor (e.g., 16 kV in 2-3 milliseconds) for pulsed power electro-crushing drilling. Such fast charging capacity may be a necessary feature to achieve a required rate of penetration (ROP) for the drilling of the wellbore.

In some implementations, the power supply at the surface may be an isolated DC power source. The isolated DC power source may have any of a number of different ratings (e.g., 600 kW at a voltage up to 6 kV). In some implementations, the power supply at the surface may deliver the desired power downhole with low ripple, uninterrupted. This power supply may be in continuous communication with a boost charger downhole. In some implementations, a boost charger may be configured to increase the DC power received from the power supply via the power cable at least partially in parallel with storage of the DC power in the at least one capacitor.

Example System

FIG. 1 is a schematic diagram depicting an example coiled tubing pulsed power drilling assembly, according to some implementations. An example pulsed power drilling system 100 may perform or be used to perform a number of example pulsed power drilling (PPD) operations 170-176. The pulsed power drilling operations 170-176 are described in more detail below (after the description of the different parts of the example pulsed power drilling system 100).

The example pulsed power drilling system 100 may include a pulsed power drilling bottomhole assembly (hereinafter "BHA") 150 positioned in a wellbore 106 and coupled to a coiled tubing 102. The coiled tubing 102 may comprise one or more coiled tubing strings sourced from one or more coiled tubing reels (not shown). The one or more coiled tubing strings (i.e., coiled tubing from one or more reels) may be coupled together to reach a target depth in the wellbore 106. While depicted on the surface 104 as an onshore drilling operation, example implementations may also be performed as an offshore drilling operation.

In some implementations, the delivered power supplied may be used to perform pulse power drilling. In particular, conventional wellbore drilling includes rotary drilling using a drill bit having cutting elements that is rotated to cause a cutting (fracturing or crushing) of rock. In contrast, pulse power drilling extends the wellbore using discharges of electric pulses that may include short duration, periodic, high-voltage pulses that are discharged through the rock in a surrounding formation. Such discharges may create an internal pressure which applies a tensional stress substantial to break or fracture the rock in tension. Pulse power drilling may create a plasma in a drilling fluid or rock downhole which functions as a high-energy discharge. The creation of the plasma downhole may involve injecting large amounts of energy into the subsurface formation. Thus, pulse power drilling may require substantial amounts of both voltage and current for successful breakage or fracturing of rock in a downhole environment.

The BHA 150 may be configured to further the advancement of the wellbore 106 using by pulsing electrical power generated by a power supply 180 at the surface 104 and transmitted to electrodes 144 via a cable 116. The electrodes 144 may be configured to emit an electrical discharge through formation material of a subsurface formation along the bottom face of the wellbore 106 and in the nearby proximity to the electrodes 144. The cable 116 may be capable of supplying power from the power supply 180 at an order of magnitude which provides for the creation of the plasma upon pulse discharges into the formation. The cable 116 may also be capable of transmitting enough power such that an electrical discharge emitted into the formation creates a sufficient amount of high internal pressure to destroy the rock in tension, as described above.

In some implementations, the cable 116 may comprise a single conductor cable or a multiconductor cable. To convey electrical power, the cable 116 may be configured to supply high-voltage DC power to the electrodes 144. In some implementations, a fiber optic cable or a coaxial communication cable may be part of the multiconductor cable configuration to transmit data between the surface 104 and the BHA 150. Alternatively or in addition, a fiber optic cable or a coaxial communication cable may be a separate cable that is conveyed downhole within the coiled tubing 102. Using a cable rather than using other communication mediums (e.g., mud pulse telemetry) may enable high speed communication with equipment at the surface 104. The cable(s) 116 may utilize a single solid cable, a solid multi-cable configuration, or stranded cables that are configured to have a low inductance.

While conveying such a cable to depth with a traditional segmented drill pipe may prove exceedingly difficult, the coiled tubing 102 may allow for both the cable 116 to be housed within and may also allow drilling fluid or mud to flow from the surface to downhole to provide cooling to the electrodes 144, removing of cuttings, etc. For example, each coiled tubing reel may comprise up to 5,000 ft of coiled tubing, although various sizes of reels may be used, whereas a stand (typically comprising three or four individual joints) of segmented drill pipe may be between 30-55 ft in length. Thus, the segmented drill pipe may require additional drill pipe to be added every 30-55 ft of drilling, and running a power cable within the drill pipe in this configuration may prove to be difficult. In some implementations, the coiled tubing reel(s) configured to store the coiled tubing 102 at the surface 104 may have an increased inductance when compared to the cable 116 and BHA 150 in the wellbore 106. This increased inductance may occur because the cable 116 is wound within or otherwise with the coiled tubing 102 in the reel. The inductance of the coiled tubing reel may increase with the number of turns the coil tubing 102 and cable 116 make around the reel. As more coiled tubing 102 is conveyed into the wellbore 106, the inductance may decrease over time. The difference in inductance at the reel and the cable 116 in the wellbore 106 may induce a voltage overshot and/or ringing from the power supply 180 when transmitting pulsed power to the capacitors 136, 142. The input filter 120, coupled in series with the cable 116 and power supply 180, may be configured to reduce the ringing caused by the inductance discrepancies.

In some implementations, continuous tubing such as the coiled tubing 102 may allow for longer wells to be drilled using a pulse-power drill string. For example, one or more coiled tubings (also referred to as coiled tubing strings) 102 housing the cable 116 may allow the BHA 150 to receive consistent, direct DC power from the power supply 180 via the cable 116 coupled to the coiled tubing 102. This sustained level of power may enable the BHA 150 to extend the wellbore 106 up to 2-3 miles vertically. The BHA 150 and electrodes 144, with the benefit of consistent, high voltage DC power, may be capable of extending the wellbore 106 up to 7 miles laterally, which may not be feasible with intermittent power sources used in other pulsed power drilling operations. As further described below, the constant supply of high voltage DC power may be used to power one or more downhole operations in addition to drilling the wellbore 106. For example, DC power output from the power supply 180 may be used to power one or more of the following: nuclear magnetic resonance (NMR) operations, mud pulsing, geosteering equipment, measurement-while drilling (MWD) equipment, etc.

The cable 116 may be configured to reduce conduction losses and total voltage drop as power travels from the power supply 180 to the BHA 150. Compared to more traditional configurations using a downhole power generation device and hydraulic power generation (downhole generator/turbine, alternator, etc.), the cable 116 may be configured to efficiently deliver up to 1,000 kilowatts (kW) of impedance-matched power to the BHA 150 with minimal losses. In some implementations, the cable 116 may deliver 200 kilovolts (kV) to the electrodes 144. The cable 116 may be mounted or otherwise secured within the coiled tubing 102. In some implementations, the cable 116 may be pre-assembled within the coiled tubing 102. In other implementations, the cable may be mounted or strapped to the outside of the coiled tubing 102. While delivering high power to the electrodes 144, the cable(s) 116 may be properly supported within or against the coiled tubing 102 to withstand a fast-flowing drilling fluid, both for inflow of drilling fluid down the coiled tubing 102 and an outflow of drilling fluid up the annulus 108. For example, drilling fluid sent down the coiled tubing 102 may be highly viscous and under high pressure. Accordingly, the coiled tubing 102 and cable 116 may form a mud-flow pipe that may also deliver electrical power to the BHA 150.

Using the cable 116 to transmit the electrical power to the BHA 150 may also improve the thermal efficiency of the system. For example, a downhole power source, motor, or generator may concentrate heat losses at a single area in the wellbore 106 (within a 75-100 ft interval). Drilling fluid in the area may be heated beyond a desired temperature, and the drilling fluid may require cycling out of the wellbore 106 at a quicker rate. However, heat losses from the cable 116 may be distributed more evenly in the wellbore 106 across the entire length of the cable 116. The distributed heat losses from the cable 116 may optimize thermal management in the wellbore 106 and enable a higher rate of penetration (ROP) of the BHA 150. Lower heat losses may enable the pulsed power section 154 to operate more efficiently, which may enable the electrodes 144 to arc into the formation (thus, drilling the formation) at an increased rate. In addition to minimizing heat losses, the pulsed power drilling system 100 may also be configured to minimize power losses. Utilizing the cable 116 eliminates the need for a complex power conversion apparatus. The power topology comprising the power supply 180, the cable 116, and the boost charger 125 may reduce power losses during the delivery of a required charge to the electrodes 144 when compared to more traditional PPD systems.

As illustrated in FIG. 1, the BHA 150 includes multiple sub-assemblies, including, in some implementations, an input filter 120 at a top of the BHA 150. The top of the assembly is a face of the BHA 150 furthest from a drilling face of the BHA 150 (which contains the electrodes 144). The input filter 120 is coupled to multiple additional sub-sections or components. The input filter 120 may be configured to reduce ripples in current and/or voltage output from the power supply 180 and along the cable 116. A boost charger 125 (comprising a voltage booster or similar power converter and a multi-mode capacitor charger) positioned below the input filter 120 may be configured to receive the filtered electrical power output from the input filter 120. In some implementations, the multi-mode capacitor charger may be a smart charger capable of fast charging. For example, the multi-mode capacitor charger may be configured to switch between a constant current mode and constant power mode to optimize charging of the primary capacitor(s) 136 depending upon which modes charge the capacitors 136, 142 fastest. The BHA 150 may additionally comprise a pulsed power controller 130, a switch bank 134 (including one or more switches 138), one or more primary capacitor(s) 136, a pulse transformer 140 with one or more primary and secondary windings, one or more secondary capacitors 142, and the electrodes 144. In some implementations, the power supply 180 (at the surface 104), the cable 116, input filter 120, and boost charger 125 (located in the wellbore 106) may be referred to as a power delivery system.

DC power output from the power supply 180 may be stored in the capacitors 136, 142 prior to a discharge criteria being satisfied. For example, a discharge or load criteria may be that a defined amount of energy has been stored. As an example, this criteria may be satisfied when the primary capacitor(s) 136 is fully charged. In another example, this criteria may be satisfied when the amount of energy that has been stored is sufficient to break the rock in the current subsurface formation. Accordingly, the amount of energy needed may vary depending on the type of rock. In another example, the criteria may be that a bottom of the pulse power drill string is in contact with a bottom of the wellbore 106. This may include any contact or some defined amount of surface area of the bottom of the pulse power drill string being in contact. In another example, the discharge criteria may be a defined amount of time since a prior electrical discharge.

In some implementations, the power may continue to be supplied by the cable 116 after the primary capacitor(s) 136 is fully charged. After the amount of energy stored in the primary capacitor(s) 136 exceeds a defined amount (e.g., fully charged), a switch within switch bank 134 may be opened to prevent additional storage of energy in the primary capacitor(s) 136 until the energy is discharged therefrom to generate a pulse of electrical discharge emitted into the subsurface formation. The switch may then be closed to again allow for storage of energy in the primary capacitor(s) 136.

The BHA 150 may be divided into a power conditioning section (PCS) 152 and a pulsed power section 154. The power conditioning section 152 may include the input filter 120 and the boost charger 125. The power supply 180 may be configured to deliver medium voltage or high voltage DC power to the boost charger 125 and power conditioning section 152 which in turn sends power to charge one or more capacitors (136, 142) of the pulsed power section 154. The pulsed power section 154 may include the pulsed power controller 130, the switch bank 134 (and switch(es) 138), the one or more primary capacitor(s) 136, the pulsed transformer 140, the one or more secondary capacitors 142, and the electrodes 144. Components may be divided between the power conditioning section 152 and the pulsed power section 154 in other arrangements, and the order of the components may be other than shown.

While a single boost charger 125 is depicted in FIG. 1, two or more boost chargers may be used along different locations along the coiled tubing 102 to boost the voltage of received power and to charge the capacitors 136, 142. For example, a boost charger 125 may be installed at one or more locations in the coiled tubing 102. In some implementations, as multiple reels of coiled tubing are conveyed into the wellbore 106, couplings between each coiled tubing string may comprise a boost charger 125. Each of the boost chargers along the coiled tubing 102 (or string of coiled tubings) may be configured to increase the voltage stepwise until reaching the capacitors 136, 142 where a final boost charger proximate to the BHA 150 may be used to charge the capacitors 136, 142.

In some implementations, DC electrical power may be conditioned by one or more input filters before storage in primary capacitor(s) 136 in the BHA 150 (as stored energy). For example, the power conditioning section 152 (or PCS) may be configured to condition electrical power prior to use within and eventual discharge from the pulsed power section 154. The input filter 120 may be configured to receive electric power from the cable 116 and output conditioned electrical power. The conditioning may comprise filtering, by the input filter 120, out ripples in current and voltage from the DC power received from the power supply 180. While the DC power is continuous, the loading of the boost charger 125 may be slightly pulsed rather than exhibiting continuous power draw. The input filter 120 may flatten any ripple in the received DC power prior to being used in the pulsed power section 154. Further processing of the electrical power output received at the PCS 152 may include voltage boosting, and frequency and/or waveform smoothing or regulating of the received electrical power.

In some implementations, the secondary capacitor(s) 142 may be configured with a higher or current rating than the primary capacitor(s) 136. In this configuration, the power supply 180 may be configured with a higher voltage rating (>6 kV) and may be coupled to the input filter 120 and boost charger 125. From the boost charger 125, the higher voltage power may be routed to the secondary capacitor(s) 142 and output from the electrode(s) 144. While FIG. 1 depicts the PCS 152 positioned in the wellbore 106 as part of the BHA 150, some implementations may position the input filter 120 and boost charger 125 at the surface 104.

A center flow tubing 114 may be coupled to an end of the coiled tubing 102 and may travel through the BHA 150, acting as a conveyance tubing. In some implementations, the center flow tubing 114 may be a shorter section of coiled tubing configured to extend through the PCS 152 and pulsed power section 154. A flow of drilling fluid 110A (illustrated by the arrow pointing downward within the coiled tubing 102) may be provided from the drilling platform 160, and flow to and through the power conditioning section 152 and pulsed power section 154 of the BHA 150, as indicated by the arrow 110B. The PCS 152 may further process and controllably provide the electrical power to the rest of the downstream BHA 150. The stored power may then be output from the electrodes 144 to perform the advancement of the wellbore 106 via periodic electrical discharges. In some implementations, pulsed power drilling (achieved by the periodic electrical discharges) may be capable of advancing the wellbore by 60 to 150 feet per hour through one or more hard rock (i.e., consolidated) subsurface formations. By using the coiled tubing 102, the pulsed power drilling may avoid issues with forming connections between joints of segmented drill pipe. The use of the coiled tubing 102 and electrodes 144 for pulsed power drilling may also eliminate the need for multiple trips to change the drill bit.

In some implementations, the drilling fluid used in the wellbore 106 may comprise a dielectric drilling fluid. The dielectric drilling fluid may be a mixture of drilling mud and one or more dielectric sands which may grant the drilling fluid dielectric properties. While the dielectric sands may increase the viscosity of the drilling fluid, their dielectric properties may ensure that electrical discharges emitted from the electrodes 144 do not propagate up the wellbore 106 or to the surface 104.

The drilling fluid may flow through the BHA 150, as indicated by arrow 110B, and flow out and away from the electrodes 144 and back toward the surface to aid in the removal of the debris generated by the breaking up of the formation material at and nearby the electrodes 144. The fluid flow direction away from the electrodes 144 is indicated by arrows 110C and 110D. In addition, the flow of drilling fluid may provide cooling to one or more devices and to one or more portions of the BHA 150. In various implementations, it is not necessary for the BHA 150 to be rotated as part of the drilling process, but some degree of rotation or oscillations of the BHA 150 may be provided in various implementations of drilling processes utilizing the BHA 150.

The flow of drilling fluid passing through the BHA 150 may continue to flow through the center flow tubing 114, which thereby provides a flow path for the drilling fluid through one or more sub-sections or components of the PCS 152 and PPS 154, as indicated by the arrow 110B pointing downward through the cavity of the sections of the center flow tubing 114. Once arriving at the electrodes 144, the flow of drilling fluid may be expelled out from one or more ports or nozzles located in or in proximity to the electrodes 144. After being expelled from the BHA 150, the drilling fluid may flow back upward toward the surface through an annulus 108 created between the BHA 150 and walls of the wellbore 106.

The center flow tubing 114 may be located along a central longitudinal axis of the BHA 150 and may have an overall outside diameter or outer shaped surface that is smaller in cross-section than the inside surface of a tool body 146 in cross-section. As such, one or more spaces may be created between the center flow tubing 114 and an inside wall of the tool body 146. These one or more spaces may be used to house various components, such as components which make up the input filter 120, the boost charger 125, the boost charger controller 128, the sensor 129, the pulsed power controller 130, the switch bank 134, the one or more switches 138, the one or more primary capacitor(s) 136, the pulsed transformer 140, and the one or more secondary capacitors 142, as shown in FIG. 1. The sensor 129 may be located in different locations within the BHA 150. As depicted in FIG. 1, the sensor 129 is positioned near the pulsed power controller 130. However, the sensor 129 may be in any location within the BHA 150 and may include more than a single sensor (depending on the size and particular sensor measurement). Other components may be included in the spaces created between the center flow tubing 114 and the inside wall of the tool body 146.

The example pulsed power drilling system 100 may include one or more logging tools 148. The logging tool(s) 148 are shown as being coupled to the coiled tubing 102 within the BHA 150. In some implementations, the logging tool 148 may be located above the BHA 150 or may be joined via a shop joint or field joint to BHA 150. The logging tool(s) 148 may include one or more logging with drilling (LWD) or measurement while drilling (MWD) tools, including a resistivity tool, gamma-ray tool, nuclear magnetic resonance (NMR) tool, etc. The logging tools 148 may include one or more sensors to collect data downhole. For example, the logging tools 148 may include pressure sensors, flowmeters, etc. The example pulsed power drilling system 100 may also include directional control, such as for geosteering or directional drilling, which may be part of the BHA 150, the logging tool(s) 148, or located elsewhere on the coiled tubing 102.

Communication from the pulsed power controller 130 to the boost charger controller 128 allows the pulsed power controller 130 to transmit data about and modifications for pulsed power drilling to the power conditioning section 152. Similarly, communications from the boost charger controller 128 to the pulsed power controller 130 may allow the power conditioning section 152 to transmit data about and modifications for pulsed power drilling to the pulsed power section 154. The pulsed power controller 130 may control the discharge of the pulsed power stored for emissions out from the electrodes 144 and into the formation, into drilling mud, or into a combination of formation and drilling fluids. The pulsed power controller 130 may measure data about the electrical characteristics of each of the electrical discharges—such as power, current, and voltage emitted by the electrodes 144. Based on information measured for each discharge, the pulsed power controller 130 may determine information about drilling and about the electrodes 144, including whether or not the electrodes 144 are firing into the formation (i.e., drilling) or firing into the formation fluid (i.e., electrodes 144 are off bottom). The power conditioning section 152 may control the charge rate and charge voltage for each of the multiple pulsed power electrical discharges. The PCS 152, with electrical power supplied via the cable 116 may create an electrical charge in the range of 10-20 kilovolts (kV) which the pulsed power controller 130 delivers to the formation via the electrodes 144.

When the pulsed power controller 130 may communicate with the power conditioning section 152, the power conditioning section 152 may ramp up and ramp down in response to changes or electrical discharge characteristics detected at the pulsed power controller 130. Because the load on the power conditioning section 152 is large (due to the high voltage), ramping up and ramping down in response to the needs of the pulsed power controller 130 may protect the power conditioning section 152 and associated components from load stress and may extend the lifetime of components of the pulsed power drilling assembly. If the pulsed power controller 130 is unable to communicate with the power conditioning section 152, then the power conditioning section 152 may apply a constant charge rate and charge voltage to the electrodes 144.

In instances where the BHA 150 is off bottom, electrical power input to the system may be absorbed (at least partially) by drilling fluid, which may be vaporized, boiled off, or destroyed because of the large power load transmitted in the electrical pulses. In instances where the BHA 150 is not operating correctly, such as when one or more switch experiences a fault or requires a reset, application of high power to the primary and/or secondary capacitors 136/142 or the electrodes 144 may damage circuitry and switches when applied at unexpected or incorrect times. In these and additional cases, communications or messages between the pulsed power controller 130 and the power conditioning section 152 may allow the entire BHA 150 to vary charge rates and voltages, along with other adjustments further discussed below. In cases where the pulsed power controller 130 and power conditioning section 152 are autonomous, i.e., not readily in communication with the surface, downhole control of the BHA 150 may improve pulsed power drilling function.

Pulse power drilling operations may include various operations. For example, such an operation may include pulsing of an electrical discharge to breaking of rock to continue to drill the wellbore 106 (e.g., electrocrushing). Another example operation may include pulsing of an electrical discharge while the drill string is off bottom for testing, formation evaluation, etc. Another example operation may include pulsing of an electrical discharge for communication. A series of example pulsed power drilling operations 170-176 are now described. A first operation 170 includes transmitting electrical power generated from the power supply 180 down the cable 116 within the coiled tubing 102. The cable 116 may be mounted within the coiled tubing 102 to withstand a flow of drilling fluid 110A during a pulsed power drilling operation. A second operation 172 includes conditioning the electrical power. For example, the input filter 120 may smooth the electrical power input from the cable 116, and the boost charger 125 may increase a voltage of the electrical power. Conditioning of the electrical power that may be may also include altering or controlling one or more electrical parameters associated with the received electrical power including, but not limited to voltage, current, phase, and frequency.

Figure 2:
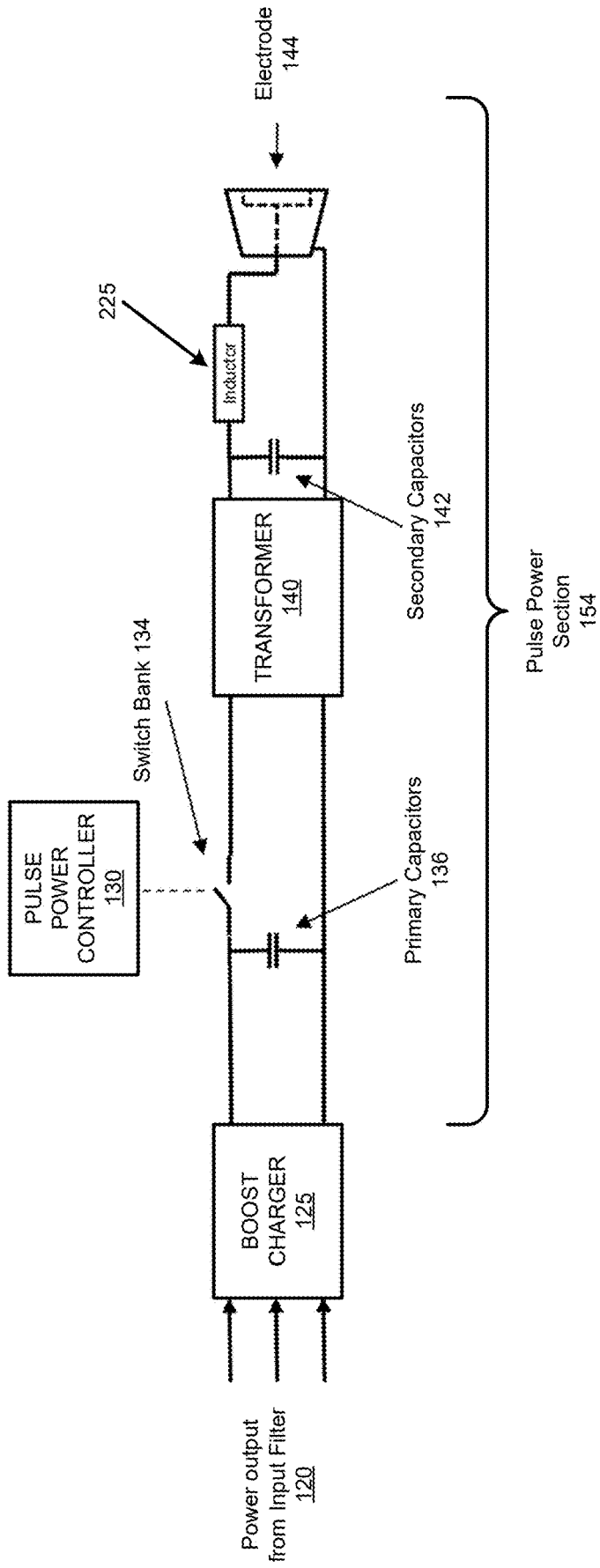
FIG. 2 is an illustration depicting an example electrical configuration for storing of electrical power for the pulsed power section of the pulsed power drilling assembly of FIG. 1, according to some implementations.

A third operation 174 includes storing the conditioned electrical power. To help illustrate, FIG. 2 is an illustration depicting an example electrical configuration for storing of electrical power for the pulsed power section of the pulsed power drilling assembly of FIG. 1, according to some implementations. The electrical power may be stored in a primary capacitor 136 ("primary capacitor") of the pulsed power section 154. The input filter 120 is configured to output conditioned DC electrical power from the cable 116 to the boost charger 125. The electrical power may be stored in the primary capacitor(s) 136 while switch(es) in the switch bank 134 are open. For simplicity, FIG. 2 depicts only one switch in the switch bank 134. However, example implementations may include other switches and configurations.

As further described below, a pulsed electrical discharge may be periodically output from the electrode(s) 144 to perform pulsed power drilling. Switch(es) of the switch bank 134 may remain open until a sufficient amount of power has been stored in the primary capacitors 136. After a sufficient amount of power has been stored in the primary capacitors 136, the switch(es) may be closed to supply power to the pulsed transformer 140 and the secondary capacitors 142 (through an inductor 225), which is then emitted from the electrode(s) 144 as a pulse of electrical discharge into the subsurface formation for pulsed power drilling. For example, the switch(es) may be closed when the primary capacitor(s) 136 storing the energy are fully charged. Alternative or additional criteria may be used to determine when to close the switch(es) (as further described below).

A fourth operation 176 includes pulsing an electrical discharge into the rock of the subsurface formation. For example, the pulsed power controller 130 may determine whether at least one discharge criteria has been satisfied. The discharge criteria may be a criteria that a defined amount of energy has been stored in the primary capacitor(s) 136. For example, the discharge criteria may be that the primary capacitor(s) 136 are fully charged, charged more than a defined percentage of the full storage capacity (e.g., 99%, 95%, 90%, 50%, etc.), etc.

Another example criteria may be that a bottom of the drill string is in contact with a bottom of the wellbore. For example, the criteria may be that at least a minimum amount of surface area of the bottom of the drill string in contact with a bottom of the wellbore 106. Another example criteria may be that a defined amount of time has elapsed since a prior pulsing of the electrical discharge. This defined amount of time may help ensure that the bottom of the drill string is in contact with a bottom of the wellbore prior to pulsing of the electrical discharge. In response to the discharge criteria being satisfied, the pulsed power controller 130 may cause the primary capacitor(s) 136 to release the stored energy from the primary capacitor(s) 136 through the electrode(s) 144—resulting in a pulse of electrical discharge into the surrounding subsurface formation. This pulsing of the electrical discharge may continue to occur periodically in response to the discharge criteria being satisfied.

Figure 3:
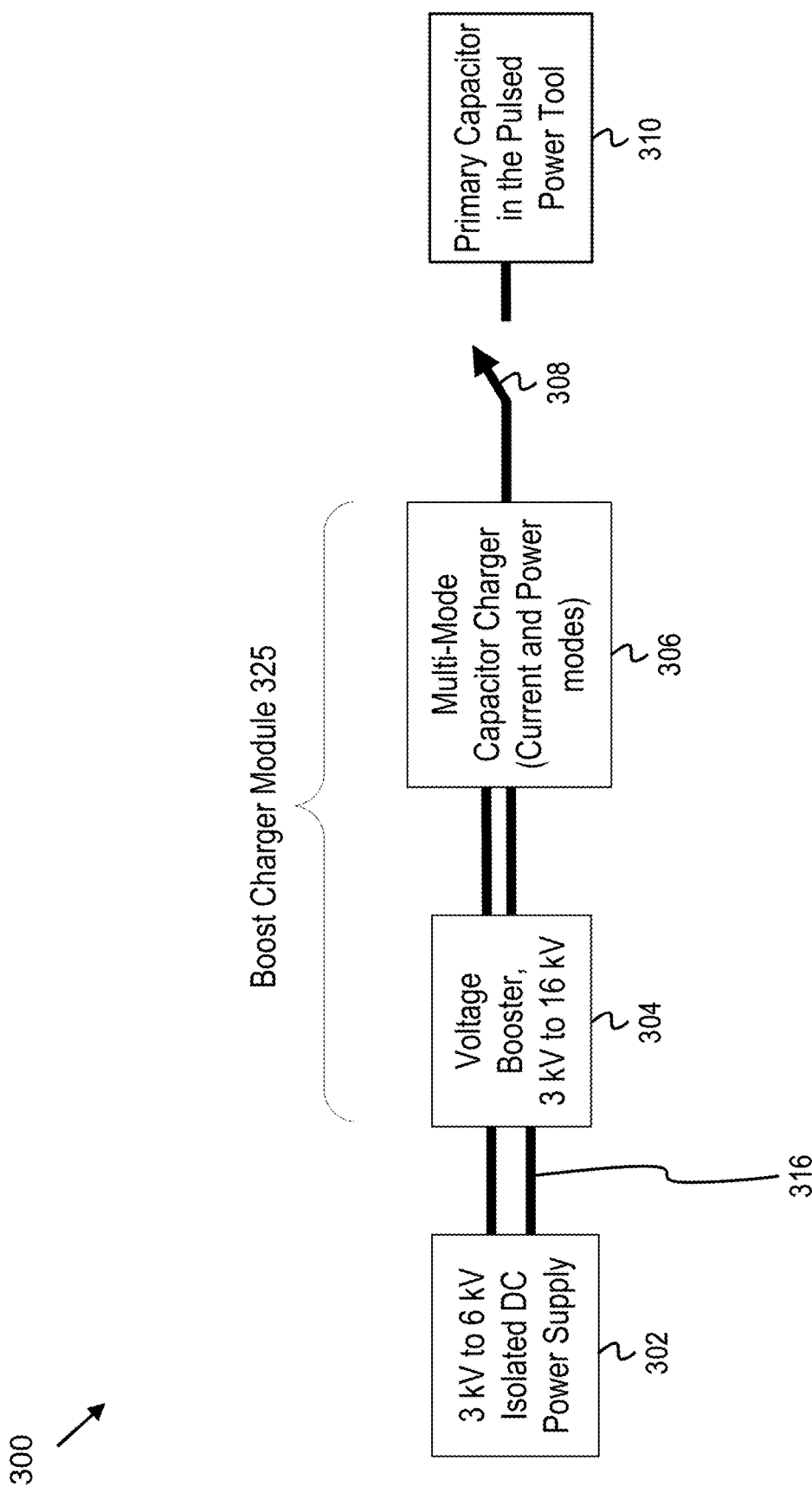
FIG. 3 is a block diagram depicting an example power delivery system, according to some implementations.

FIG. 3 is a block diagram depicting an example power delivery system 300, according to some implementations. The power delivery system of the pulsed power drilling system 100 may include the power supply 180, input filter 120, and boost charger 125 of FIG. 1. A 3 kV to 6 kV isolated DC power supply 302 (hereafter referred to as the "DC Power Supply 302") may be disposed at the surface of the wellbore proximate to a drilling rig, similar to the drilling platform 160 of FIG. 1. The DC power supply 302 may have a typical power rating of 600 kW and a voltage rating up to 6 kV. The DC power supply 302 may be configured to deliver desired, uninterrupted, low-ripple power along a cable 316. The cable 316 may be housed in a coiled tubing (similar to the cable 116 being housed in the coiled tubing 102 of FIG. 1). The DC power supply 302 may be in continuous communication with the boost charger module 325, comprising both a voltage booster 304 and multi-mode capacitor charger 306. Some implementations of the DC power supply 302 may be capable of outputting higher voltages (>6 kV). In this configuration, the cable 316 may be configured with a smaller conductor diameter (with lower conduction loss along the cable 316) and an increased surface area of an exterior insulation.

Coupled to the DC power supply 302 is the boost charger module 325. The boost charger module 325 may comprise the voltage booster 304 and the multi-mode capacitor charger (also referred to as a smart charger) 306. The voltage booster 304 may receive the output filtered electrical power from the input filter 120 of FIG. 1 at a first voltage and output a boosted electrical power at a second voltage that is greater than the voltage of the filtered electrical power received as an input. In some implementations, the voltage booster may receive an input power having a voltage between 3-6 kV and delivering power up to 500-800 kW. These numbers may not be substantial to emit an arc from the electrodes 144 to fracture formation rock, so the voltage booster 304 may boost an input voltage up to 16 kV.

The boosted voltage output from the voltage booster 304 may be input to the multi-mode capacitor charger 306. The multi-mode capacitor charger 306 may be configured to charge the primary capacitor(s) 136 and secondary capacitor(s) 142 at a constant (i.e., not pulsed) rate. A charge rate of the capacitors 136, 142 may be augmented depending on a desired rate of penetration to be achieved by the electrodes 144. To achieve a higher ROP, more pulses per second may be required. A drilling operation may initiate with a lower pulsed rate of, for example, 10 pulses per second that are emitted into a subsurface formation. Over time, the pulsed rate may increase to a rate of up to, for example, 300 pulses per second. At this rate, the multi-mode capacitor charger 306 may only have 3.3 milliseconds (ms) to charge the capacitors prior to emission from the electrodes 144. Modulating the rate of charging of the capacitors and a desired number of pulses to emit may be controlled via the boost charger controller 128 of FIG. 1.

In some implementations and as previously discussed, the multi-mode capacitor charger 306 may be configured as a smart charger capable of switching between constant current and constant power modes to avoid overloading the power delivery system 300. In some implementations, other electric load modes may be possible. For example, the multi-mode capacitor charger 306 may begin with a constant current mode during charging of the capacitors 136, 142 and switch to a constant power mode when a power delivery limit of the DC power supply 302 has been reached. Sustaining the constant power mode may cause the current to reduce over time, and the multi-mode capacitor may choose to remain in the constant power mode or switch back to the constant current mode based on various system parameters. For example, the multi-mode capacitor charger 306 may analyze load properties of the DC power source 302 (or power supply 180) and capacitors 136, 142. The multi-mode capacitor charger 306 may avoid overloading the DC power supply 302 and avoid choking the capacitors 136, 142 of power by modulating between the various electrical modes to optimize the use of components within the power delivery system 300.

The voltage booster 304 and multi-mode capacitor charger 306 may work in tandem within the boost charger module 325 to boost charge a high voltage pulsed capacitor, such as the primary capacitor (in the pulsed power tool) 310, to approximately 15 kV within 5 to 10 milliseconds (ms). However, the boost charger module 325 may also be configured to charge the primary capacitor in less than 5 ms or greater than 10 ms, if desired. Fast voltage boosting and fast charging may be needed to achieve required rates of penetration (ROP) while pulsed power drilling with an electrocrushing drill bit. The voltage booster 304 and multi-mode capacitor charger 306 are contained within the boost charger module 325, similar to the boost charger 125 of FIG. 1. However, in some implementations, the voltage booster 304 and multi-mode capacitor charger 306 may be separate, distinct components that are used to boost the voltage of received power and to charge the primary capacitor 310, respectively. A switch 308 may be configured to close to permit charging of the primary capacitor 310. The switch 308 may also be configured to open to prohibit charging of the primary capacitor 310.

Figure 4:
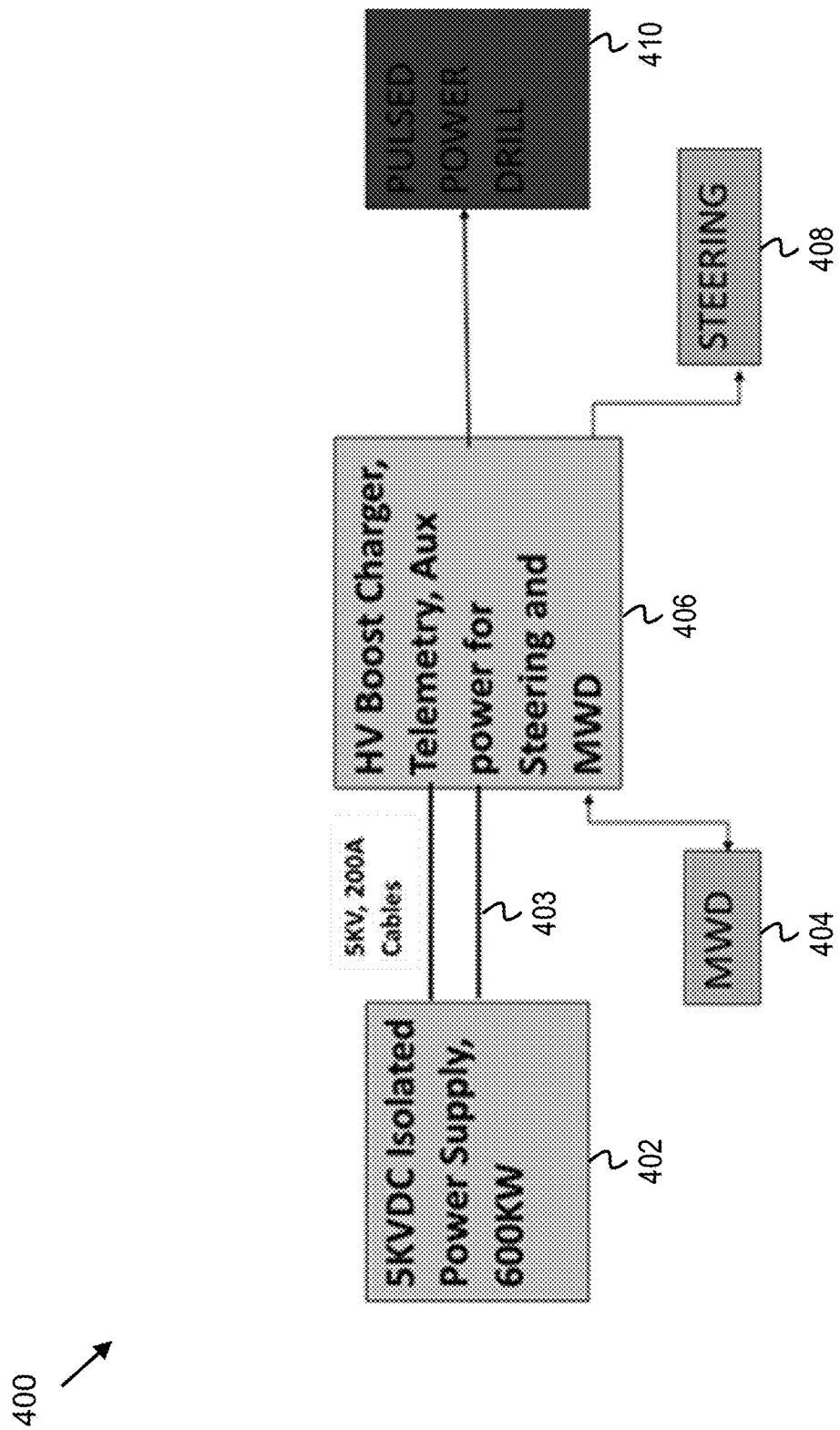
FIG. 4 is a system diagram depicting an electrical subsystem of the pulsed power drilling system, according to some implementations.

FIG. 4 is a system diagram depicting an electrical subsystem 400 of the pulsed power drilling system, according to some implementations. The electrical subsystem 400 may comprise similar components to the power delivery system 300 of FIG. 3. A DC power supply 402 may be configured to supply isolated, high voltage electrical power to a boost charger module 406 capable of high voltage, similar to the boost charger module 325. The DC power supply 402 may be configured to supply electrical power in a range of 5 kV to 20 kV and up to 600 kW, although other configurations may be possible. The DC power may be transmitted along one or more cables 403 to the boost charger module 406. In some implementations, the cables 403 may be rated as capable of transmitting 5 kV and 200 amperes (A), although higher rated cables may be used. One or more cables of the cables 403 may be used to transmit power to the boost charger module 406 while, in some implementations, one or more other cables may be used as an electrical return path. While a majority of the power received from the DC power supply 402 may be routed to the boost charger module 406 and eventually to a pulsed power drill 410 comprising one or more electrodes, some of the power may be routed for auxiliary functions. The delivered power may be used to power actuators to open/close valves, extend/contract arms for stabilization, steering, etc. In other examples, the power may be used to power an electric motor, a hammer, various types of sensors (e.g., sensors for formation evaluation such as resistivity sensors), nuclear magnetic resonance devices, etc. In particular, the boost charger module 406 may be coupled to an MWD unit 404 and a steering unit 408. The MWD unit 404 may receive electrical power from the boost charger 406 to power various sensors for measurement while drilling operations. The steering unit 408 may be used to power telemetry devices and sensors used for geosteering. In some implementations, the cable 403 is a coaxial cable configured to transmit power and communications. Measurements from sensors coupled to or within the MWD unit 404 may be sent through cable 403 and back to the surface via the coaxial cable. The pulsed power drill 410 may comprise electrodes similar to the electrodes 144 of FIG. 1, and the pulsed power drill 410 may consume a bulk of the power sent through the cable 403 to fracture and drill into a subsurface formation.

Figure 5:
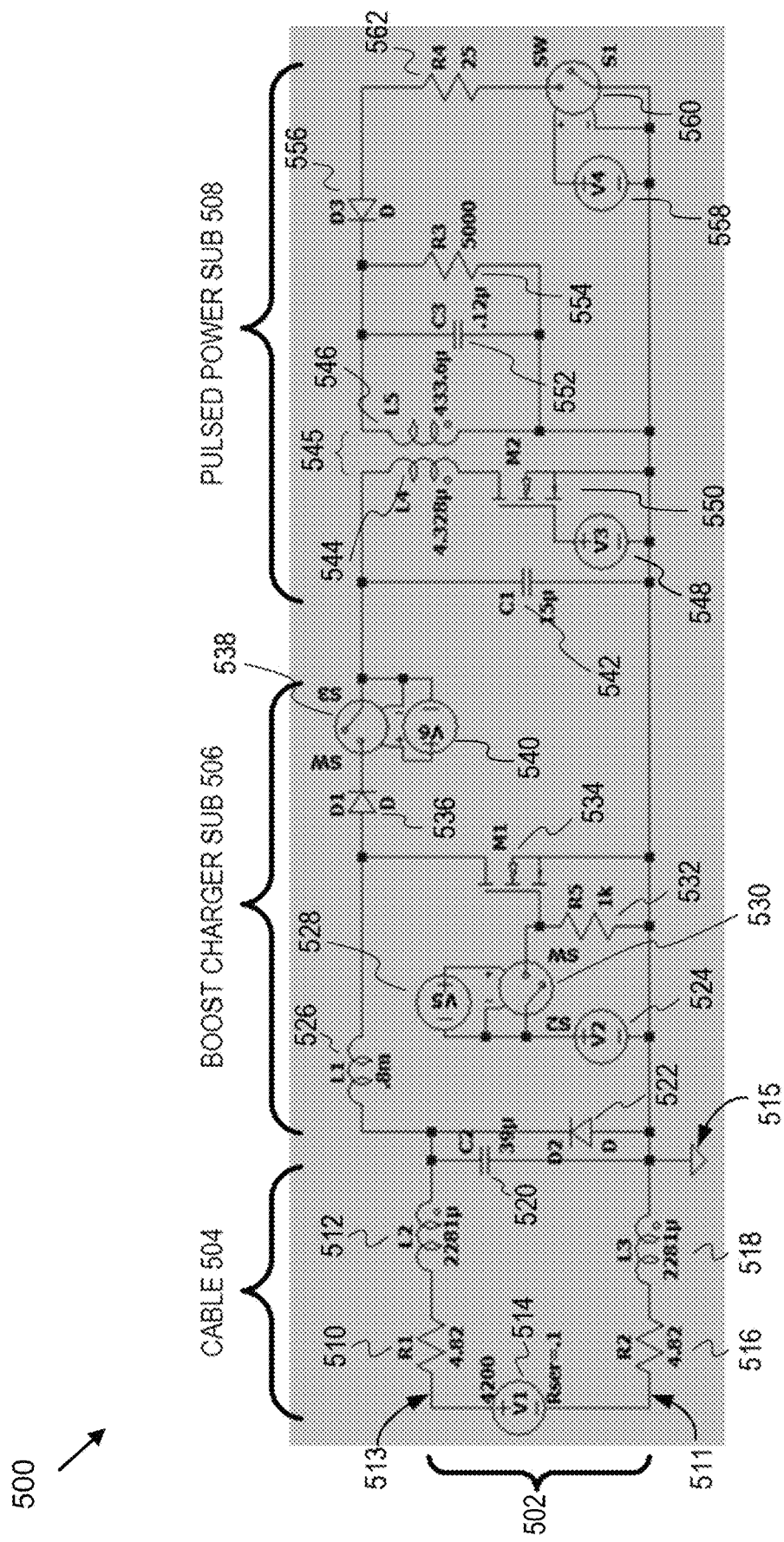
FIG. 5 is a circuit diagram depicting a high-level system schematic of the pulsed power drilling assembly for powering the pulsed power operations based on power from a surface of a wellbore via a power cable, according to some implementations.

FIG. 5 is a circuit diagram depicting a high-level system schematic of the pulsed power drilling assembly for powering the pulsed power operations based on power from a surface of a wellbore via a power cable, according to some implementations. A circuit diagram 500 depicts electrical components and circuitry of the pulsed power drilling system 100 as divided into modules comprising a DC power source 502, a cable 504, a boost charger sub 506, and a pulsed power sub 508. The DC power source 502 may be similar to the DC power supply 302 of FIG. 3, the cable 504 may be similar to the cable 116, the boost charger sub 506 may be similar to the boost charger 125, and the pulsed power sub 508 may be similar to the pulsed power section 154. However, these divisions are non-limiting, and individual electrical components including, but not limited to resistors, capacitors, controllers, processors, etc. may be shared between components or in a different order from that shown in FIG. 5. In some implementations, components of FIG. 5 may instead be replaced by other components or by additional hardware, firmware, software, etc. The circuit diagram 500 is now described in an order similar to an order of power flow through the various components.

The cable 504 may be represented by resistors 510, 516, and inductors 512 and 518. The cable 504 may be coupled to a capacitor (input filter) 520. The boost charger sub 506 may include a diode 522 (D2), an inductor 526, a voltage source 524, a voltage source 528, a switch 530, a resistor 532, a switch gate 534, a diode 536, a switch 538, and a voltage source (which may also be referred to as a controller) 540. The pulsed power sub 508 may also include a voltage source (also referred to as a controller) 548, a transformer 545, a switch gate 550, a capacitor 552, a resistor 554, a diode 556, a voltage source 558, a switch (representative of one or more electrodes) 560 and a resistor 562.

Similar to FIG. 1, DC electrical power is transmitted to the pulsed power sub 508 from a DC power source 502 at the surface of the wellbore. The DC power source 502 may be represented by a voltage source 514 (V1) configured to transmit power through a cable 504. As shown, the cable 504 may be represented by a resistor and inductor in series. In particular, the cable 504 may be represented by the resistor 510 in series with the inductor 512 that is electrically coupled to a positive terminal of the DC power source 502 and represented by the resistor 516 in series with the inductor 518 that is electrically coupled to a negative terminal of the DC power source 502. Output from the inductor 512 and output from the inductor 518 are electrically coupled across the capacitor C2, also referred to as an input filter 520. This input filter 520 is similar the input filter 120 described in FIG. 1. The conductive plate of capacitor C2 that is electrically coupled to the inductor 518 is also electrically coupled to a ground 515.

In some implementations, the input filter 520 may be a capacitor used to reduce ripple voltage components, remove resonant frequencies, and smooth current and voltage waveforms from the DC power source 502 to provide a filtered electrical output to the boost charger sub 506. In some implementations, the input filter 520 may be a bi-directional input filter to ensure that high-frequency switching noise and other high-frequency characteristics of the boost charger sub 506 are not affecting upstream components within the cable 504 or DC power source 502. Alternatively, or in addition, the input filter 520 may be a low-pass filter, a high-pass filter, a band-pass filter, a band-stop filter, etc.

After filtering (by the input filter 520), current is input to the boost charger sub 506. The diode 522 is electrically coupled in parallel with the input filter 520. The diode 522 is electrically coupled in series with an inductor 526 to transmit current through the inductor 526. In some implementations, the inductor 526 may be an air coil, a coil surrounding a non-dielectric material or a soft magnetic material, a length of wire formed around a coil or toroidal core, a length of wire formed around a metallic or semi-metallic core, etc. From the inductor 526, power is routed to the switch gate 534 (M1). In some implementations, the switch gate 534 may be controlled by a controller similar to the boost charger controller 128 of FIG. 1. In other implementations, the switch gate 534 may comprise a gate driver. Instead of being controlled by a controller, the gate driver may modulate a time duration and frequency to control a boosting of an input voltage and the charging of one or more capacitors.

To boost an input voltage, the boost charger sub 506 may build current at the inductor 526 with power received from the input filter 520 when the switch gate 534 is open. Upon switch closure, current may flow through the switch gate 534 to voltage sources 524 (V2) and 528 (V5). The voltage sources 524, 528 may increase an input voltage from the input filter 520 to a much higher voltage suitable for fracturing rock. Similar to the voltage booster 304 of FIG. 3, the voltage sources 524, 528 may increase the voltage from a range of 3-5 kV to 15-20 kV, although other quantities may be possible. In other implementations, the voltage sources 524, 528 may partially boost a voltage, and other voltage sources within the circuit may supplement the partially-boosted voltage prior to arcing into a subsurface formation. When a switch 530 closes, the current may travel through a resistor 532 and through the diode 522 once more. Upon reaching a desired voltage or a time duration has elapsed, the switch gate 534 may again open. Current at the increased voltage may then flow through a diode 536 (D1) to ensure unilateral energy flow when boosting and charging a capacitor 542 (C1) of the pulsed power sub 508.

A switch 538 (S3) may be coupled in series with the output of the inductor 526. In some implementations, the switch 538 may be a series disconnect switch for the pulsed power sub 508. In some implementations, a controller 540 (V6) may comprise a voltage source and may be configured to control the opening, closing, and timing of the switch 538. The switch 538 may be closed by the controller 540 when power is required at the pulsed power sub 508. In some implementations, the controller 540 may be similar to the boost charger controller 128 of FIG. 1. The switch 538, diode 536, and controller 540 may together be referred to as a capacitor charger. This capacitor charger may be similar to the multi-mode capacitor charger 306 of FIG. 3.

The switch 538 may be opened when the capacitors 542, 552 are fully charged in order to protect the boost charger sub 506 from discharge effects of the electrode 560. If the electrode 560 is discharged when in electrical contact with boost charger sub 506, the boost charger sub 506 may suffer electrical load shock or upstream capacitive discharge. Alternatively or in addition, the switch 538 may be configured to open based a predetermine time interval. In some implementations, the switch 538 may be configured to default to an open position, and to close when a difference in voltage is detected between the output of inductor 526 and, for example, the capacitors 542, 552 of the pulsed power sub 508.

When the switch 538 closes, current and the boosted voltage from the boost charger sub 506 is routed to the capacitor 542 and a capacitor 552 (C3). The capacitor 542 may be similar to the primary capacitor(s) 136 of FIG. 1. The capacitor 542 may be charged while a switch gate 550 (M2) is open, thus isolating the rest of the pulsed power sub 508 from the boost charger sub 506. In some implementations, the switch gate 550 may be similar to the switch bank 134 of FIG. 1. When the capacitor 542 is finished charging to a final voltage, the switch gate 550 is closed so that energy is pulsed into the pulsed power sub 508. Power may flow through the capacitor 542 and through a controller 548 (V3) before traveling through the closed switch gate 550 and to the inductor 544 (L4). In some implementations, the controller 548 may comprise a voltage source, and the controller 548 may be similar to the pulsed power controller 130 of FIG. 1. The controller 548 may be configured to control a timing of the switch gate 550. The inductor 544 may be an electrical load electrically coupled to an inductor 546 (L5). The inductors 544, 546 may be together referred to as a pulsed transformer 545 configured to transfer electrical power and the boosted voltage from the inductor 544 to the inductor 546. In some implementations, the pulsed transformer 545 may be similar to the pulsed transformer 140 of FIG. 1. From the pulsed transformer 545, current flows to charge the capacitor 552 and may travel through a resistor 554 (R3) before being halted by a diode 556 (D3). In some implementations, the capacitor 552 may be similar to the secondary capacitor(s) 142 of FIG. 1.

To emit an arc from the pulsed power sub 508, power is sent from the capacitor 542 to the capacitor 552 via the pulsed transformer 545 and the switch gate 550. When the capacitor 552 reaches a charging threshold, energy is then released from the capacitor 552 and leaves the pulsed power sub 508 in the form of an arc emitted by an electrode 560. The electrode may be similar to the electrode(s) 144 of FIG. 1, and the electrode 560 may be depicted as a switch to convey its on-off (i.e., pulsing) nature.

In an example charging and discharging cycle within the pulsed power sub 508, 10 ms may be allocated per pulse of the electrode 560. Nine milliseconds may be allocated for charging the capacitors 542, 552, and 1 ms may be allocated for pulsing an arc from the electrode 560. During the 9 ms dedicated to charging, the switch 538 may be closed and the capacitor 542 may have 16 kV across it while the switch gate 550 is closed. During the 1 ms for pulse emission, the switch 538 is commanded to open (via a time duration elapsing or via the controller 540), the switch gate 550 is commanded to close (via the controller 548 or via an elapsed time duration), and the 16 kV across the capacitor 542 are sent to the capacitor 552. From the capacitor 552, the electricity is emitted as an arc from the electrode 560, and a subsequent charging cycle may begin. The timing of the pulses may be controlled via the controller 548's actuation of the switch gate 550. After emitting an arc from the electrode 560, residual current may follow a return path through a resistor 562 and a series diode 556.

In some implementations, the switch gates 534 and 550 may be transistors including, but not limited to field-effect transistors (FETs), power metal-oxide-semiconductor FETs (MOSFETs), silicon carbide MOSFETs, a solid state switch, an insulated gate bipolar transistor (IGBT) or any other controllable transistor or combination thereof appropriate for high frequency switching. Active control of the switching of the switch gates 534, 550 may allow for the modulation and/or adjustment of various characteristics of the electrical power as it is boosted within the boost charger sub 506 and output from the pulsed power sub 508 via the electrode 560. The switch gate 550 may comprise a higher current rating than the switch gate 534 for pulsing. For example, the switch gate 534 may comprise a peak current rating of 400-500 Amperes, whereas the switch gate 550 may be rated for 30-40 kA for pulsing.

Example Configurations for Pulsed Power Directional Drilling

Example electrode assemblies for pulsed power directional drilling are now described with reference to FIGS. 6-11. While depicted separately, multiple of these example electrode assemblies may be combined in a same assembly.

In some implementations, the pulse power drill string may be required to advance a borehole at some angle or orientation other than a vertical orientation relative to the surface where the borehole opening is located. Thus, one or more mechanisms may be required to allow the electrode assembly to advance the borehole in an off-center axis orientation relative to the longitudinal axis of the borehole at the present location where the pulse power drill string is operating at the bottom face of the borehole. Such directional drilling may be mechanically and/or electrically based. Examples of mechanically based directional drilling include different mechanical movements of parts of the electrode assembly of the pulse power drill string. For example, the electrode assembly may include a bent housing, an articulation of the ground ring, and/or an articulation of the electrode. Examples of electrically based directional drilling include the electrode assembly having multiple electrodes that are individually controlled for emitting the electrical energy and/or the electrode assembly having a ground ring separated into multiple segments that are individually controlled for providing a return electrical path for the emitted electrical energy.

Figure 6:
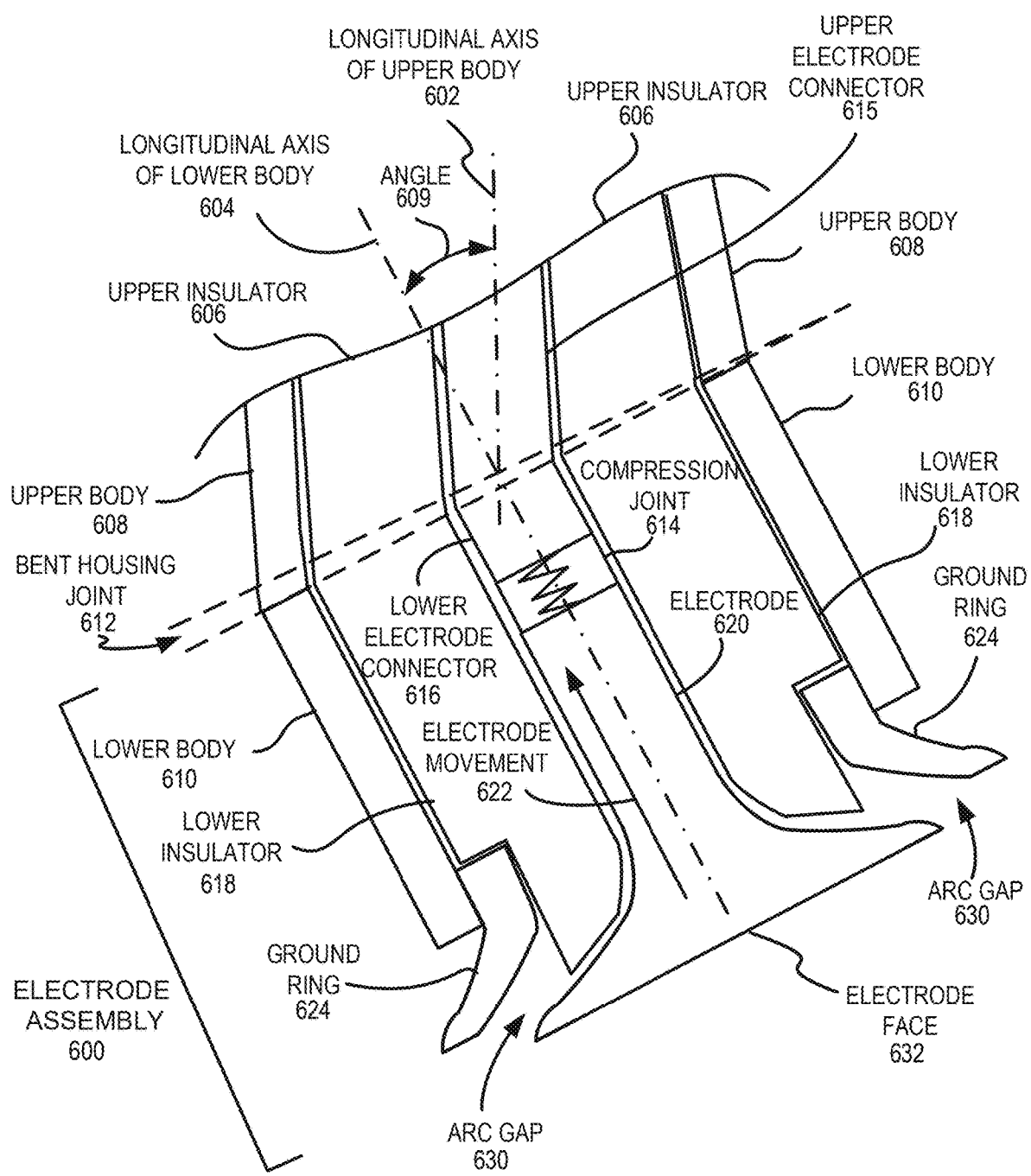
FIG. 6 is a schematic diagram depicting an example electrode assembly having a bent housing for pulsed power directional drilling, according to some implementations.

FIG. 6 is a schematic diagram depicting an example electrode assembly having a bent housing for pulsed power directional drilling, according to some implementations. In FIG. 6, an electrode assembly 600 having a lower body 610, an electrode 620 with an electrode face 632, and a ground ring 624. The lower body 610 is joined to an upper body 608 at a bent housing joint 612. For example, the upper body 608 may be part of the tool body 146 of FIG. 1, and the electrode assembly 600 may be the electrode(s) of the BHA 150 of FIG. 1.

A longitudinal axis 602 of the upper body 608 extends in a non-parallel orientation relative to a longitudinal axis 604 for the lower body 610. The difference in the relative orientations of these two longitudinal axes may for example be one-degree of angle, or a faction of a degree of angle, or up to multiple degrees of angle, such as one to five degrees inclusive.

The upper body 608 encloses an upper insulator 606 encircling an upper electrode connector 615. The upper electrode connector 615 may be formed from a conductive material that provides an electrical path for electrical energy generated and controllably provided to the electrode assembly 600 by one or more other devices coupled to the upper body 608. The upper body 608 itself may also act as a return path for the electrical energy discharged from the electrode 620 and flowing to the ground ring 624 of the electrode assembly 600. Thus, the upper insulator 606 may provide electrical isolation between the upper electrode connector 615 and the upper body 608 itself. The bent housing joint 612 may be constructed so that the angle of orientation of the longitudinal axis 602 of the upper body 608 is offset by an angle 609 relative to the angle of orientation of the longitudinal axis 604 of the lower body 610.

The lower body 610 includes a lower electrode connector 616 coupled to a compression joint 614, which in turn is coupled to the electrode 620 of the electrode assembly 600. The lower electrode connector 616 and the compression joint 614 may provide an electrical path for the electrical energy to travel from the upper electrode connector 615 positioned within the upper body 608 to the electrode 620. The ground ring 624 is electrically coupled to the lower body 610 and may provide a return path for electrical energy discharged from the electrode face 632 of the electrode 620. In some implementations, electrical energy discharged from the electrode 620 may be used to break up formation material surrounding a wellbore in the vicinity of the electrode face 632.

In some implementations, the ground ring 624 may have a generally ring or torrid shape and encircle a lower portion of the electrode 620. A lower insulator 618 positioned in the lower body 610 may provide electrical isolation between the lower body 610 and the lower electrode connector 616, the compression joint 614, and a portion of the electrode 620 that is not the electrode face 632.

In addition to providing part of the electrical path for the flow of electrical energy provided to the electrode 620, the compression joint 614 may also allow the electrode 620 to move upward, in the direction of an electrode movement 622, when the electrode face 632 is brought into contact with a formation present at the bottom face of a wellbore where the pulsed power drill string is positioned. The upward movement of the electrode 620 moves the electrode 620 in closer proximity to the ground ring 624, which does not move relative to the lower body 610 when the electrode 620 moves, and thus lessens the space present in an arc gap 630 between the electrode 620 and the ground ring 624. In some implementations, this lessening of the space present in the arc gap 630 may be a trigger that allows the electrical energy present at the electrode face 632 to "jump" or arc across the arc gap 630 and flow to the ground ring 624, where it may then travel through the lower body 610 and the upper body 608 to the source of the electrical energy.

In some implementations, tilting or orientating the angle 609 of the electrode face 632 relative to the longitudinal axis 602 may steer the electrode assembly 600 to direct the orientation of the advancement of the wellbore going forward. For example, the angle 609 of the electrode face 632 may define a direction of advancement for the wellbore being advanced by the operation of the electrode assembly 600 in a direction parallel to the electrode face 632. As such, the general direction of the advancement of the wellbore may be "steered" based on the orientation of the electrode face 632 created by the bent housing joint 612.

In addition, overall rotational orientation of the upper body 608 may be changed, that is, the pulsed power drill string may be rotated around the longitudinal axis 602 of the upper body 608, and thus re-direct and/or control of the relative orientation of the bent housing joint 612 and thus the orientation of the electrode face 632. This rotational capability allows the control of the angle 609 of radial orientation of the electrode face 632 relative to the longitudinal axis 602, and thus control the direction of the advancement of a wellbore in any angular orientation relative to the longitudinal axis 602.

Figure 7:
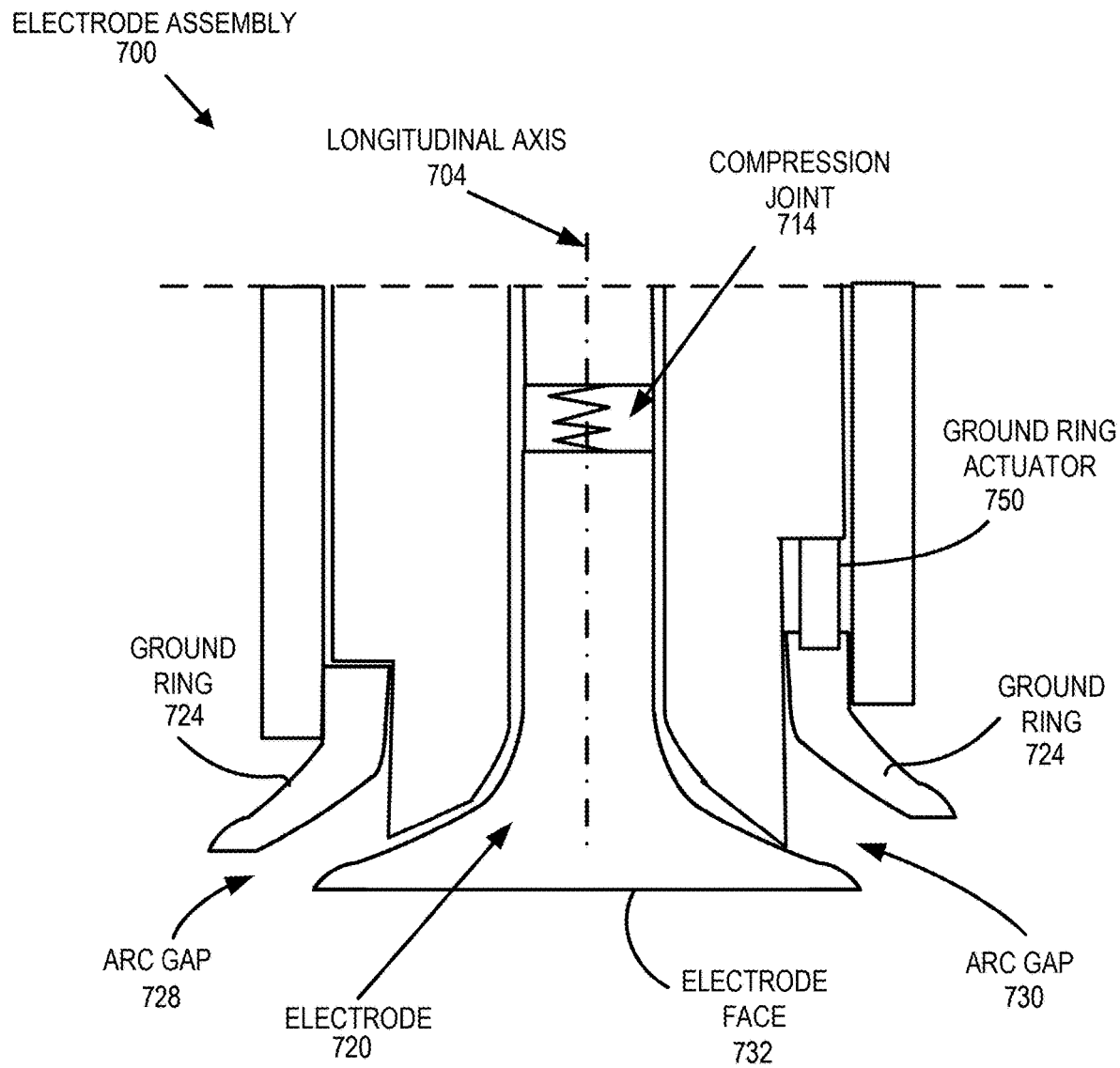
FIG. 7 is a schematic diagram depicting an example electrode assembly having an adjustable ground ring for pulsed power directional drilling, according to some implementations.

FIG. 7 is a schematic diagram depicting an example electrode assembly having an adjustable ground ring for pulsed power directional drilling, according to some implementations. In FIG. 7, an electrode assembly 700 includes an electrode 720 (having a compression joint 714 and an electrode face 732), a ground ring 724, and a ground ring actuator 750. The electrode assembly 700 enables controlling of the orientation of the ground ring 724 relative to a longitudinal axis 704 of the electrode assembly 700 using the ground ring actuator 750 in order to provide for steering the electrode assembly 700 in a wellbore advancement operation. The ground ring actuator ("actuator") 750 may be coupled to at least some portion of the ground ring 724. In some implementations, the electrode assembly 700 may include multiple ground ring actuators, where each ground ring actuator is coupled to a respective portion of the ground ring 724.

The actuator 750 may be an electrically powered device, such as a motor, such as a stepper motor or servo motor, or may be a hydraulic or pneumatically actuated device. The actuator 750 may be configured to control raising and/or lowering a portion of the ground ring 724. Alternatively or in addition, the actuator 750 may be configured to tilt a portion of the ground ring 724 relative to the longitudinal axis 704. This may change the relative space between that portion of the ground ring 724 and the electrode 720 relative to an arc gap 730. Because the actuator 750 is positioned on only a portion of the electrode 720, the arc gap on other portions of the electrode 720 may be different. For example, the arc gap 730 may increase while the arc gap 728 increase less or not at all.

By changing the relative spacing between a portion of the ground ring 724 and the electrode face 732, the ability of the electrode 720 to induce a flow of electrical energy in the direction of the manipulated portion of the ground ring 724 may be increased or decreased. For example, if the actuator 750 is used to raise the portion of the ground ring 724 to a position as shown in FIG. 7 that is higher, and thus further away from the electrode face 732, the electrical energy flowing from the electrode face 732 will be more susceptible to flow across the small arc gap present between the electrode face 732 and the non-manipulated (unraised) portion of the ground ring 724. As another example, if the actuator 750 is used to tilt the portion of the ground ring 724 toward the electrode 720, electrical energy flowing from the electrode face 732 will be more susceptible to flow across the smaller arc gap present between the tilted portion of the ground ring 724 and the electrode face 732. Thus, the relative position of the ground ring 724 at different radial positions around the electrode 720 may be used to directionally control the concentration of the electrical energy jumping or arching across to different portions of ground ring 724. This directional control of the electrical energy discharging from the electrode 720 may then steer the direction of the advancement of the wellbore as the electrode assembly 700 operates to break up the formation material adjacent to the electrode face 732.

Figure 8:
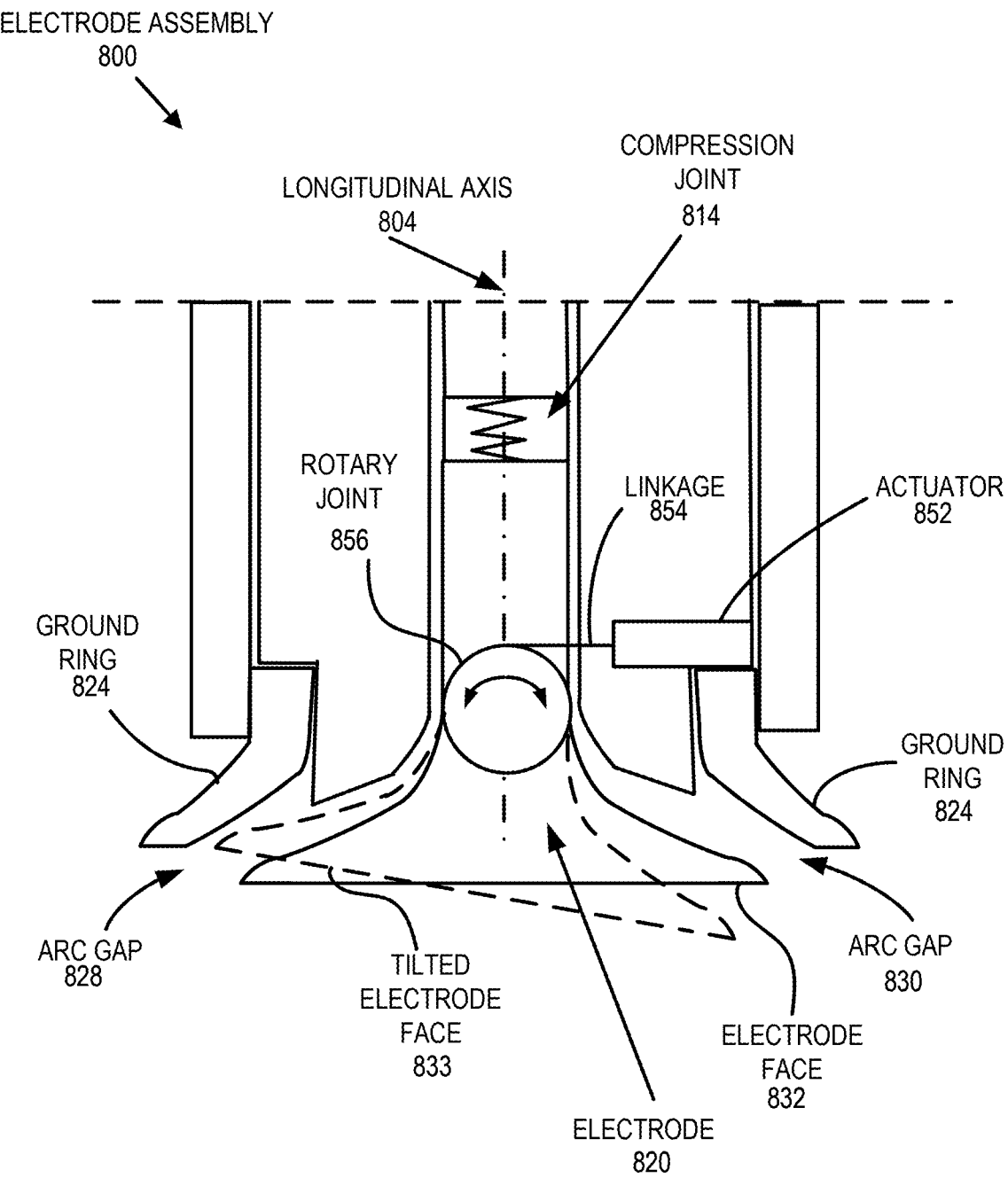
FIG. 8 is a schematic diagram depicting an example electrode assembly having an electrode face with an adjustable rotational orientation for pulsed power directional drilling, according to some implementations.

FIG. 8 is a schematic diagram depicting an example electrode assembly having an electrode face with an adjustable rotational orientation for pulsed power directional drilling, according to some implementations. In FIG. 8, an electrode assembly 800 includes an electrode 820 (having a compression joint 814 and an electrode face 832), a ground ring 824, a rotary joint 856, an actuator 852, and a linkage 854. The electrode assembly 800 is configured to control the rotational orientation of the end portion of the electrode 820, and thus the orientation of the electrode face 832 relative to a longitudinal axis 804 of the electrode 820 and the ground ring 824 in order to provide a mechanism for steering the electrode assembly 800 in a wellbore advancement operation.

As shown in FIG. 8, the lower portion of the electrode 820 is coupled to the rotary joint 856 configured to allow the lower portion of the electrode 820, and thus the orientation of the electrode face 832, to be "tilted" relative to a longitudinal axis 804. An example of a tilted positioning of the lower portion of the electrode assembly 800 relative to a standard vertical positioning is illustrated by the dashed outline of the lower portion of the electrode assembly 800 in FIG. 8 (see a tilted electrode face 833).

The rotary joint 856 may be coupled to the actuator 852 through the linkage 854. The actuator 852 may be an electrically powered device, such as a motor, such as a stepper motor or servo motor, or may be a hydraulic or pneumatically articulated device. The actuator 852 is configured to control, for example by extending or retracting the linkage 854, the rotational position of the rotary joint 856, and thus control movements that allow for rotational positioning of the bottom portion of the electrode 820.

By controlling the rotational positioning of the rotary joint 856, the angle of the electrode face 832 relative to the longitudinal axis 804, may be controlled. By controlling the relative angle of orientation of the lower portion of the electrode assembly 800, the assembly or pulsed power drill string may be "steered" to direct the orientation of the advancement of the wellbore. For example, by changing the relative orientation of the electrode face 832, the spacing between some portions of the electrode face 832 may be decreased, and thus provide a shorter distance within the arc gap 828 separating that portion of the electrode face 832 (e.g., tilted upward in FIG. 8 and depicted as the tilted electrode face 833) compared to portions of the electrode face 832 that are tilted downward, and thus moved further away from the ground ring 824 due to the rotational positioning of the lower portion of the electrode 820. Thus, an arc gap 830 is greater than the arc gap 828 in this tilted position.

Implementations may also be able to rotate the lower portion of the electrode 820 from the centered position to a position tilting the lower portion of the electrode 820 closer to the portion of the ground ring 824 on the right-hand side of FIG. 8. Thus, the rotational positioning of the lower portion of the electrode 820 may be used to directionally control the concentration of the electrical energy jumping or arching across from different portions of electrode face 832 relative to the radial position of the ground ring 824. This directional control of the electrical energy being discharged from the electrode 820 may then steer the direction of the advancement of the wellbore as the electrode assembly 800 operates to break up the formation material adjacent to the electrode face 832. In some implementations, the rotational motion provided by the rotary joint 856 may be limited to rotary motion in a plane intersecting the longitudinal axis 804, and thus providing rotational movement in one directional plane, for example to the right or left of the longitudinal axis 804 in a single plane. In various implementations, a small amount of rotation of the Assembly, for example up to 90 degrees of rotation of the Assembly around the longitudinal axis 804, may allow for further "steering" of the advancement of the wellbore by the electrode assembly 800 in any radial direction around the longitudinal axis 804 using a combination of rotational positioning of the lower portion of the electrode assembly 800 in conjunction with rotational positioning of the Assembly.

Figure 9:
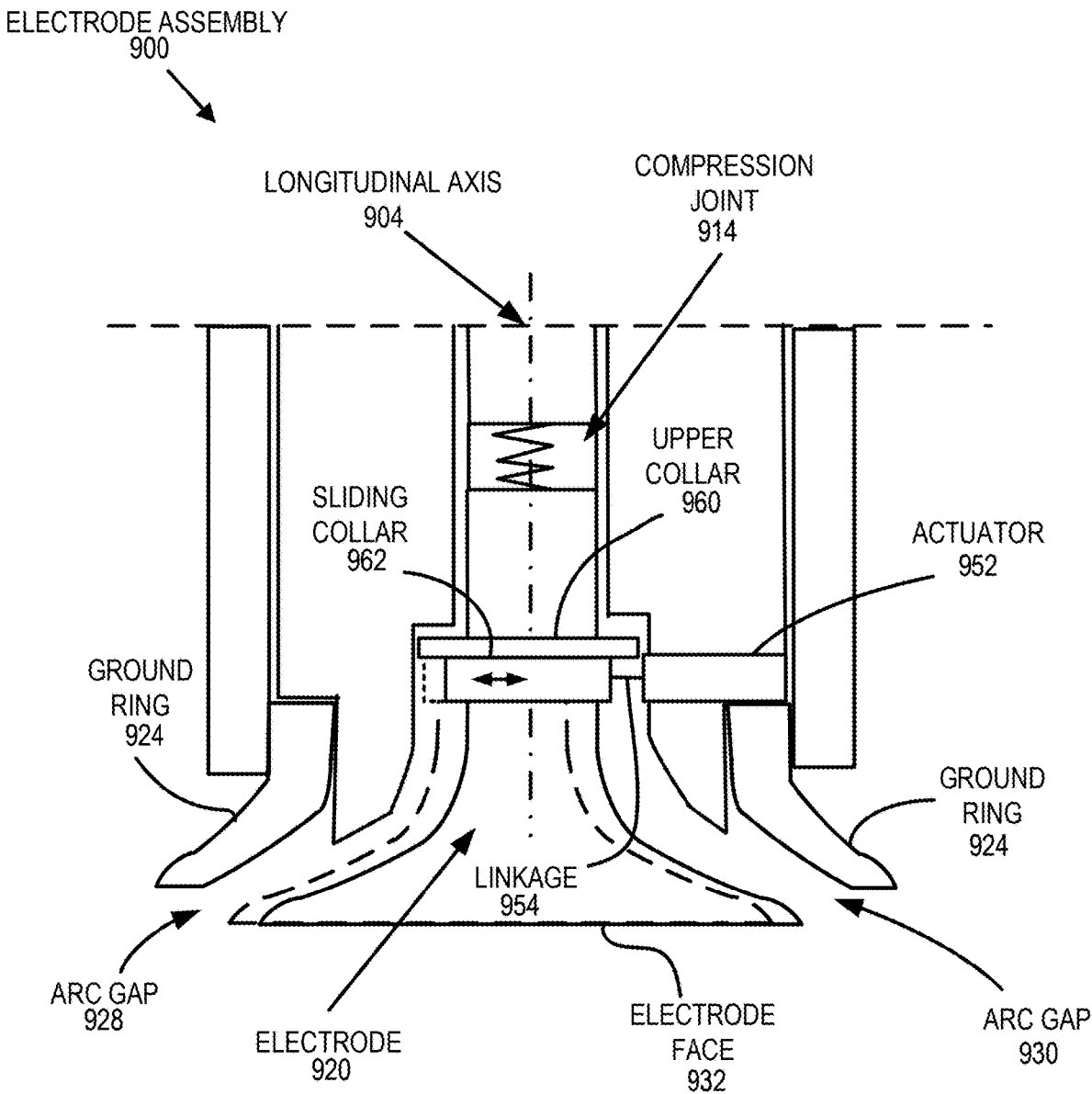
FIG. 9 is a schematic diagram depicting an example electrode assembly having an electrode face that is laterally adjustable for pulsed power directional drilling, according to some implementations.

FIG. 9 is a schematic diagram depicting an example electrode assembly having an electrode face that is laterally adjustable for pulsed power directional drilling, according to some implementations. In FIG. 9, an electrode assembly 900 includes an electrode 920 (having a compression joint 914 and an electrode face 932), a ground ring 924, an actuator 952, a sliding collar 962, an upper collar 960, and a linkage 954. The electrode assembly 900 is configured to control a lateral positioning of a lower portion of the electrode 920, and thus the lateral positioning of the electrode face 932 relative to a longitudinal axis 904 of the electrode assembly 900 and the ground ring 924 in order to provide a mechanism for steering the electrode assembly 900 in a wellbore advancement operation.

As shown in FIG. 9, the lower portion of the electrode 920 is coupled to the sliding collar 962, where the sliding collar 962 is coupled to the upper collar 960 of the electrode 920. The sliding collar 962 may be configured to allow the lower portion of the electrode 920, and thus the relative spacing between opposite sides of the electrode face 932 and the ground ring 924, to be varied. An example of a shifted lateral positioning of the lower portion of the electrode 920 relative to a standard positioning of the electrode 920 (e.g., the electrode 920 centered on the longitudinal axis 904) is illustrated by the dashed outline of the lower portion of the electrode assembly 900.

As shown by the dashed outline, the lower portion of the electrode 920 has been "shifted" to the left in FIG. 9 relative the centered position for the electrode assembly 900, and thus has moved closer to the portion of the ground ring 924 on the left side of FIG. 9. Implementations may include also being able to "shift" the lower portion of the electrode 920 from the centered position to a position placing the lower portion of the electrode 920 closer to the portion of the ground ring 924 on the right-hand side of FIG. 9.

As shown in FIG. 9, the sliding collar 962 may be coupled to the actuator 952 through the linkage 954. The actuator 952 may be an electrically powered device, such as a motor, such as a stepper motor or servo motor, or may be a hydraulic or pneumatically articulated device. The actuator 952 may be configured to control, for example by extending or retracting the linkage 954, the lateral position of the sliding collar 962 relative to the longitudinal axis 904, and thus control movements that allow for lateral positioning of the lower portion of the electrode 920. By controlling the lateral positioning of the sliding collar 962, the lateral positioning of the lower portion of the electrode 920 with respect to an off-set relative to the longitudinal axis 904 may be controlled.

By controlling the lateral positioning of the lower portion of the electrode 920, the Assembly or pulsed power drill string may be "steered" (i.e., geosteering) to direct the orientation of the advancement of the wellbore going forward. For example, by changing the lateral positioning of the lower portion of the electrode 920, the spacing between some portions of the electrode face 932 may be brought into closer spacing, and thus provide a shorter distance within arc gaps 928-930 separating that portion of the electrode face 932 from the ground ring 924 compared to other portions of the electrode face 932. The discharge of the electrical energy may favor and/or be directed in the direction of the portion of the electrode face 932 positioned closest to the ground ring 924. Thus, the lateral positioning of the lower portion of the electrode 920 may be used to directionally control the concentration of the electrical energy jumping or arching across from different portions of the electrode face 932 relative to the radial position of the ground ring 924. This directional control of the electrical energy being discharged from the electrode 920 may then steer the direction of the advancement of the wellbore as the electrode assembly 900 operates to break up the formation material adjacent to the electrode face 932. In some implementations, the lateral motion provided by the sliding collar 962 may be limited to lateral motion perpendicular to longitudinal axis 904, for example to the right or left of the longitudinal axis 904 as shown in FIG. 9.

In various implementations, a small amount of rotation of the Assembly itself, for example up to 90 degrees of rotation of the Assembly around the longitudinal axis 904, may allow for further "steering" of the advancement of the wellbore by the Assembly in any radial direction around the longitudinal axis 904 using a combination of lateral positioning of the lower portion of the electrode 920 in conjunction with rotational positioning of the Assembly.

Figure 10:
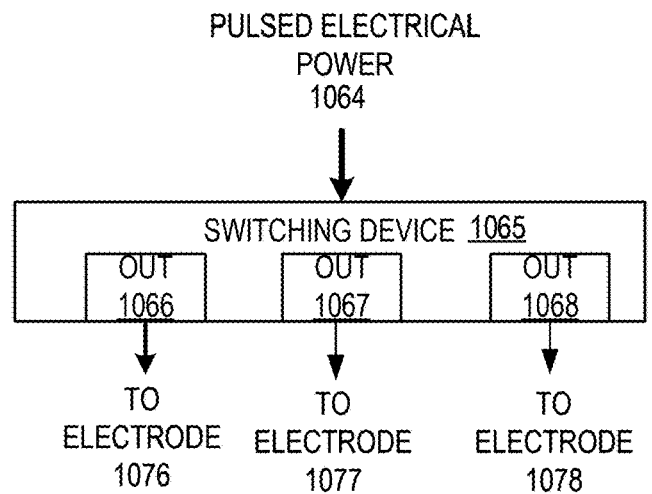
FIG. 10 is a schematic diagram depicting an example electrode assembly with multiple electrodes for adjustable power emission for pulsed power directional drilling, according to some implementations.
Figure 10:
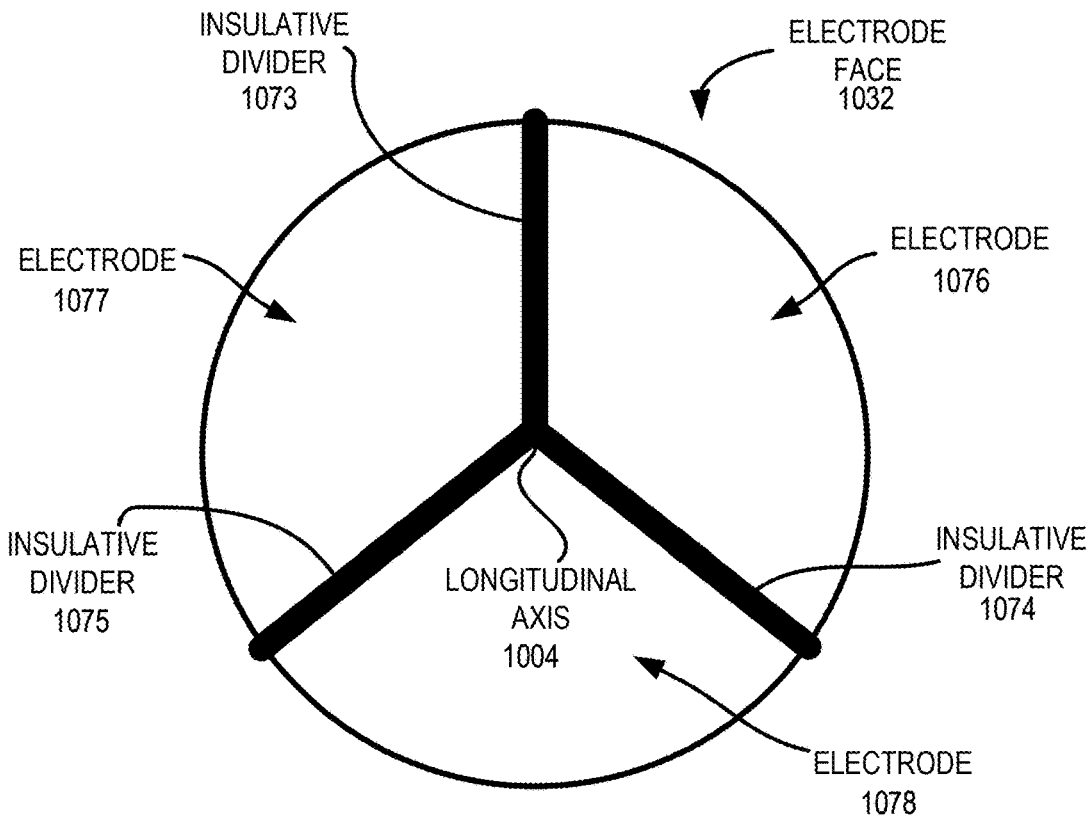

FIG. 10 is a schematic diagram depicting an example electrode assembly with multiple electrodes for adjustable power emission for pulsed power directional drilling, according to some implementations. As shown in FIG. 10, an electrode face 1032 is positioned along a longitudinal axis 1004 that may represent the longitudinal axis of the Assembly or pulsed power drill string. The electrode face 1032 includes an electrode 1076, an electrode 1077, and an electrode 1078. Each of the electrodes 1076-1078 are electrically isolated from one another by respective insulative dividers providing electrical isolation between the individual electrodes. An insulative divider 1073 is positioned between the electrode 1076 and the electrode 1077. An insulative divider 1074 is positioned between the electrode 1076 and the electrode 1078. An insulative divider 1075 is positioned between the electrode 1077 and the electrode 1078.

The application of electrical energy to the electrodes 1076-1078 may be controlled individually or in some combination to provide and control the discharge of the electrical energy used to break up formation material in proximity to the electrode face 1032. For example, as illustrated in FIG. 10, a switching device 1065, which may include solid-state switches, may receive pulsed electrical power 1064 at an input, and be controllably operated to selectively switch ON and OFF outputs OUT 1066, OUT 1067, and OUT 1068 in order to selectively apply the pulsed electrical power 1064 to individual electrodes or to some combination of the electrodes in a predefined pattern. In this example, the OUT 1066 is coupled to the electrode 1076, the OUT 1067 is coupled to the electrode 1077, and the OUT 1068 is coupled to the electrode 1078.

In some implementations, the pulsed electrical power 1064 may be output to any combination of the electrodes 1076-1078. In some implementations, the pulsed electrical power 1064 may output to a subset of the electrodes 1076-1078, wherein a subset is defined as at least one but not all of the electrodes 1076-1078. For example, the switching device 1065 may output the pulsed electrical power 1064 to the electrode 1076 and not to the electrodes 1077-1078. In another example, the switching device 1065 may output the pulsed electrical power 1064 to the electrode 1076 and the electrode 1078 and not to the electrode 1077. In some implementations, the switching device 1065 may be configured to output the pulsed electrical power to a plurality of the electrodes 1076-1078 but at varying levels. For example, the switching device 1065 may output 10% of the pulsed electrical power 1064 to the electrode 1076, output 70% of the pulsed electrical power 1064 to the electrode 1077, and output 20% of the pulsed electrical power 1064 to the electrode 1078. Thus, the switching device 1065 may control which electrodes are to receive the pulsed electrical power 1064 and may control the amount of the pulsed electrical power 1064 that each electrode is to receive.

In various implementations, the number of electrodes present may be a number of electrodes other than three electrodes, such as only two electrodes or more than three individual electrodes. Further, while the surface area and shape of the first, second and third electrodes as shown in FIG. 10 are illustrated as being the same, implementations of the multi-electrode electrode face may include having either one or more electrodes that have different effective attributes (such as shape and/or size relative to one another). In some implementations, the effective attributes of one or more of the electrodes may change dynamically during downhole operations. For example, the electrode assembly may be moved (tilted, shifted laterally or longitudinally, etc.) to alter the effective size and/or shape of an electrode. In another example, some type of (conductive or nonconductive) component may be moved relative to the face of the electrode to alter the level of current emitted into the formation. For instance, a nonconductive component may be moved to at least partially cover the face of the electrode, thereby effectively altering the size and/or shape of the electrode. By controlling the pattern of the electrical energy provided to the electrodes 1076-1078 individually or in some combination and/or in a particular patten of application, the area of the formation material being broken up adjacent to the electrodes may be controlled, and thereby in turn controlling the overall direction of the wellbore being advanced by the pulsed power operation. Additionally, as described, example implementations may use a same power source to provide selective power to different electrodes. In other words, a separate power source is not required to selectively power an electrode or subset of electrodes.

In some implementations, each of the electrodes 1076-1078 may be independently movable relative to each other. For example, each of the electrodes 1076-1078 may be movable to different positions relative to each other longitudinally, laterally, tilted, etc. Such implementations may be used for directional drilling. For instance, if the intended direction of the drilling of the wellbore is closest to the electrode 1077, the electrode 1077 may longitudinally be positioned further down in the wellbore as compared to the electrodes 1076 and 1078.

Figure 11:
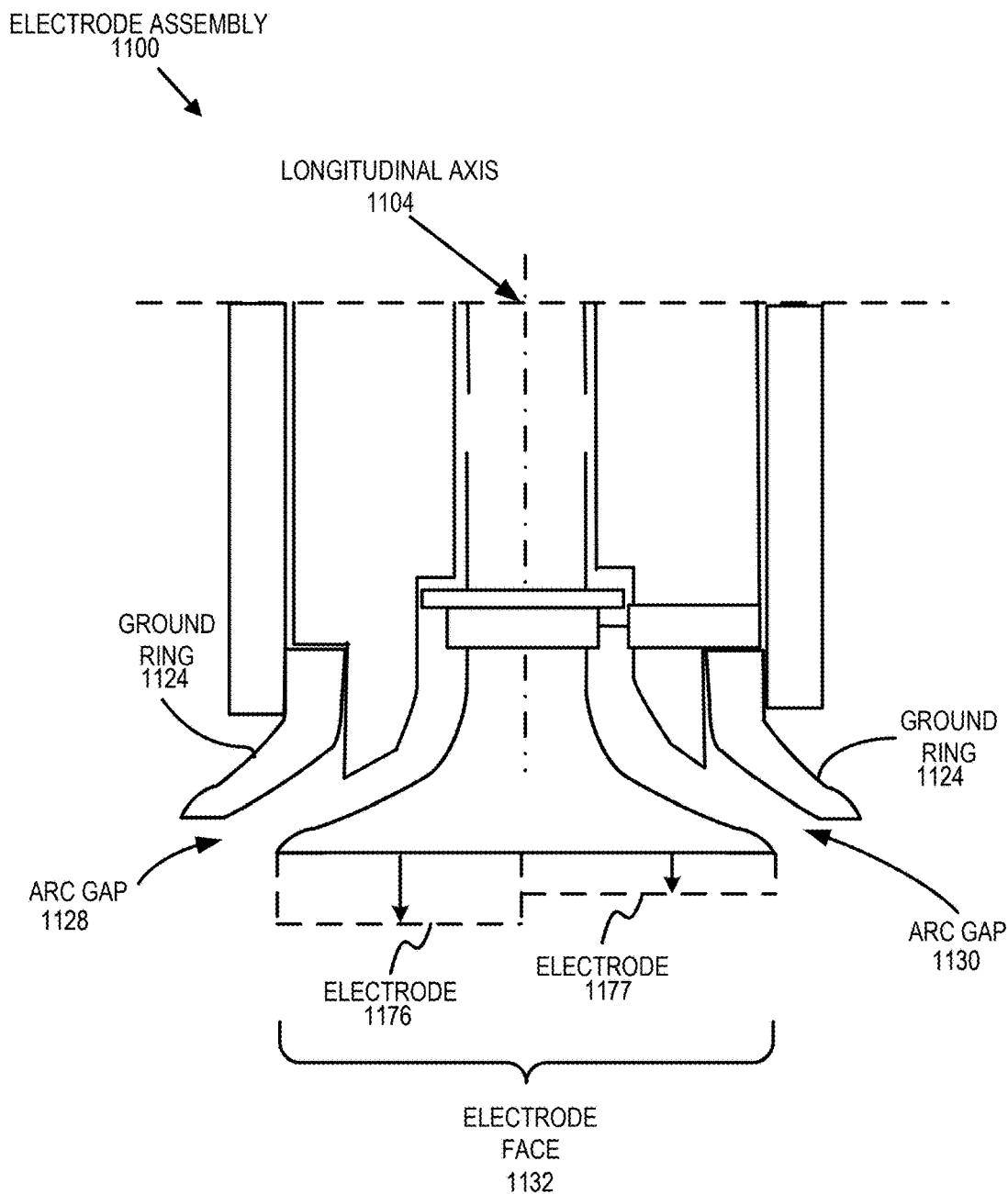
FIG. 11 is a schematic diagram depicting an example electrode assembly with multiple electrodes that are independently movable for pulsed power directional drilling, according to some implementations.

To help illustrate, FIG. 11 is a schematic diagram depicting an example electrode assembly with multiple electrodes that are independently movable for pulsed power directional drilling, according to some implementations. In this example, FIG. 11 depicts an electrode assembly wherein each of the multiple electrodes independently move longitudinally. However, in some implementations, such independent movement may be one or more of longitudinal, lateral, tilt or any other type of movement to assist in the directional drilling. In FIG. 11, an electrode assembly 1100 includes an electrode face 1132 that is positioned along a longitudinal axis 1104 that may represent the longitudinal axis of the Assembly or pulsed power drill string. In this example, the electrode face 1132 includes an electrode 1176 and an electrode 1177. Not shown, the electrode face 1132 may include additional electrodes. For example, the electrode face 1132 may be configured similar to the electrode face 1132 of FIG. 11—which insulative dividers positioned between the electrodes. The electrode assembly 1100 also includes a ground ring 1124.

As shown by the dashed outlines of the lower portion of the electrode assembly 1100, the electrode assembly 1100 is configured to control a longitudinal movement of individuals electrodes (independent of each other). Such independent movement of the individual electrodes may provide an additional mechanism for steering the electrode assembly 1100 in a wellbore advancement operation. The dashed outlines of the electrode 1176 and the electrode 1177 illustrate example longitudinal movements of the electrode 1176 and the electrode 1177, respectively. In this example, the longitudinal movement of the electrode 1176 is greater than the longitudinal movement of the electrode 1177 such that the electrode 1176 is positioned further down the wellbore as compared to the electrode 1177.

The independent movement of the individual electrodes may be performed by one or more actuators coupled to the electrodes. For example, the actuators may be an electrically powered device, such as a motor, such as a stepper motor or servo motor, or may be a hydraulic or pneumatically articulated device. The actuators may be configured to extend or retract each electrode independently of each other, relative to the electrode face 1132. By controlling the positioning of each electrode independently, the Assembly or pulsed power drill string may be "steered" to direct the orientation of the advancement of the wellbore going forward. For example, extending the electrode 1176 further relative to the other electrodes may steer the direction of the wellbore in the direction of the electrode 1176.

In some implementations, the electrode face 1132 may be similar to the electrode face 1132 of FIG. 11. A wedge with a central mandrel may be positioned in the center of the electrode face 1132. The wedge may be configured to cause movement or deviation of one or more of the electrodes independent of the other electrodes. In some other implementations, there may be multiple wedges, wherein each wedge includes a central mandrel. Each wedge/central mandrel may be independently movable relative to the other wedges/central mandrels. Each wedge/central mandrel may be associated with one electrode. Movement of the wedge/central mandrel may cause lateral movement of the associated electrode (independent of the other electrodes).

In various implementations, a small amount of rotation of the Assembly itself, for example up to 90 degrees of rotation of the Assembly around the longitudinal axis 1004, may allow for further "steering" of the advancement of the wellbore by the Assembly in any radial direction around the longitudinal axis 1104 using a combination of independent positioning of each of the electrodes in conjunction with rotational positioning of the Assembly.

Figure 12:
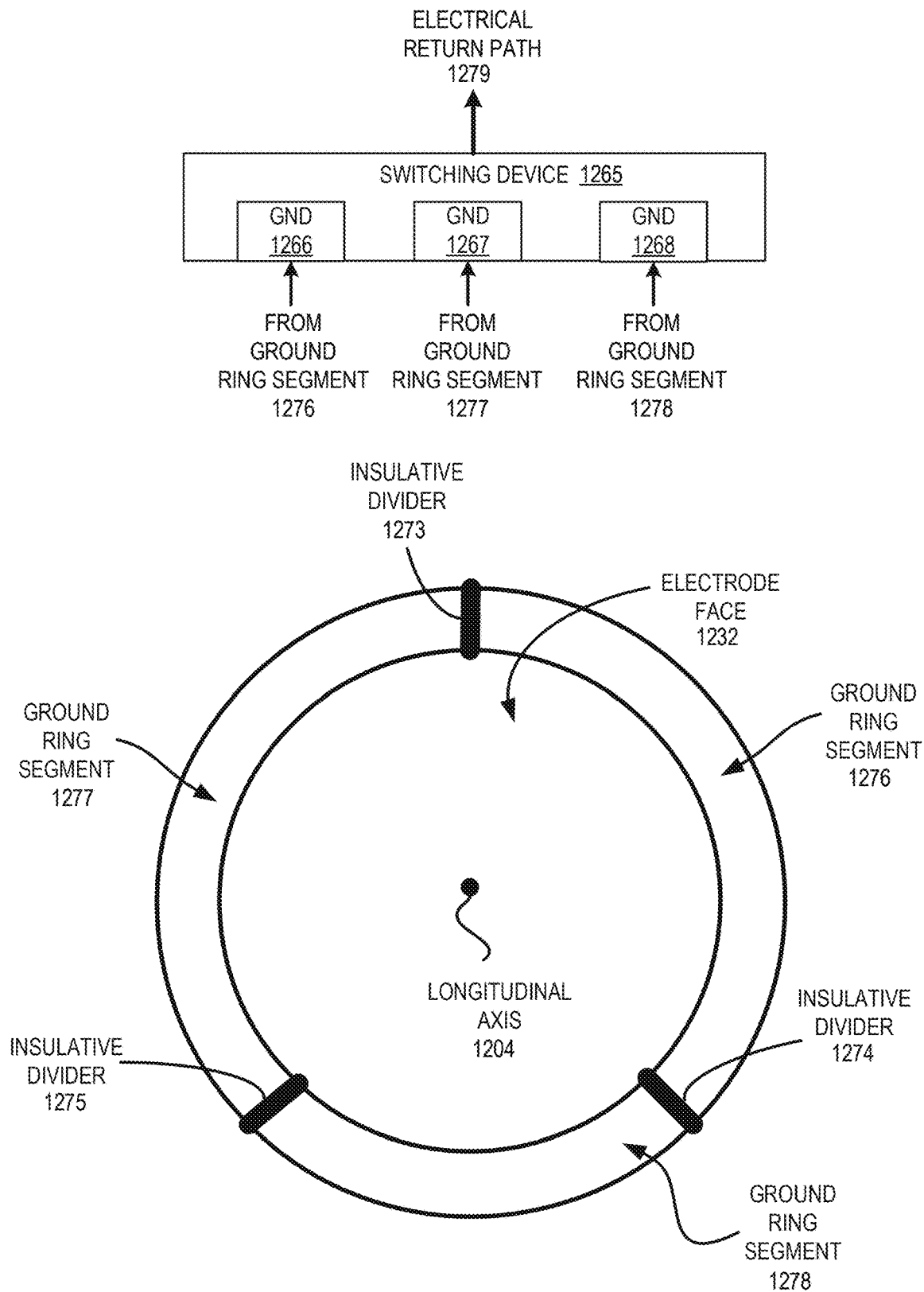
FIG. 12 is a schematic diagram an example electrode assembly having a ground ring divided into multiple segments that are configurable for providing an electrical return path for pulsed power directional drilling, according to some implementations.

FIG. 12 is a schematic diagram depicting an example electrode assembly having a ground ring divided into multiple segments that are configurable for providing an electrical return path for pulsed power directional drilling, according to some implementations. As shown in FIG. 12, a ground ring surrounds an electrode face 1232 that is positioned along a longitudinal axis 1204 that may represent the longitudinal axis of the assembly or pulsed power drill string. The ground ring includes multiple segments (a ground ring segment 1276, a ground ring segment 1277, and a ground ring segment 1278). Each of the ground ring segments 1276-1278 is electrically isolated from one another by respective insulative dividers providing electrical isolation between the individual ground ring segments. An insulative divider 1273 is positioned between the ground ring segment 1276 and the ground ring segment 1277. An insulative divider 1274 is positioned between the ground ring segment 1276 and the ground ring segment 1278. An insulative divider 1275 is positioned between the ground ring segment 1277 and the ground ring segment 1278.

The multiple segments of the ground ring may be individually coupled and disconnected so that these individual potions either provide or do not provide an electrical return path for the electrical energy being discharged from the electrode(s) of the electrode assembly. In a similar manner to that described above with respect to the to the multiple electrodes of FIG. 11, the individually controllable segments of the ground ring may be switched into and out of the electrical return path being provided for return of the electrical energy being discharged from the electrode back to the electrical source of the pulsed electrical energy for the Assembly.

For example, as illustrated in FIG. 12, a switching device 1265, which may include solid-state switches, may be controllable to selectively couple and to disconnect the grounds GND 1266, GND 1267, and GND 1268 to an electrical return path 1279 provided to complete the electrical circuit for the electrical energy being discharged by the electrode(s) in order to selectively control and direct the pulsed electrical power being discharged from the individual electrodes or to some combination of the electrodes in a predefined pattern. In this example, the GND 1266 is coupled to the ground ring segment 1276, the GND 1267 is coupled to the ground ring segment 1277, and the GND 1268 is coupled to the ground ring segment 1278.

In some implementations, the switching device 1265 may control which ground ring segments 1276-1278 are configured to provide a return path for the electrical energy discharged by the electrode(s). The switching device 1265 may configure any combination of the ground ring segments 1276-1278 for providing a return path for the electrical energy. In one example, the switching device 1265 may enable a return path for the electrical energy through the ground ring segment 1276 but not through the ground ring segments 1277-1278. In another example, the switching device 1265 may enable a return path for the electrical energy through the ground ring segment 1276 and the ground ring segment 1277 but not through the ground ring segment 1278.

By controlling the switching of these individual segments of the ground ring, the general direction of the electrical energy being discharged from the electrode across the arc gap may be controlled, and thus the area where the formation material is being broken up and also the general direction of the advancement of the wellbore may be steered.

In some implementations, adjustable stabilizers may be used for creating directional bias of the drilling. In particular, the diameter of the stabilizer on the drill string may be changed in order to change the force balance on a portion of the drill string (lower portion), which may directly affect the directional tendency of the drill bit. Such implementations may be effective in making inclination changes as it is gravitational force that may pull the drill string toward the low side of the wellbore until a stabilization point makes contact with the bottom of the wellbore. These adjustable stabilizers may also be used for azimuthal corrections where drill bits are interfacing boundaries between hard and soft formations. The unbalance of lateral forces created by the differing formation strengths may be enhanced or offset with the introduction of a stabilization change to adjust the force balance of the drill string.

Figure 13:
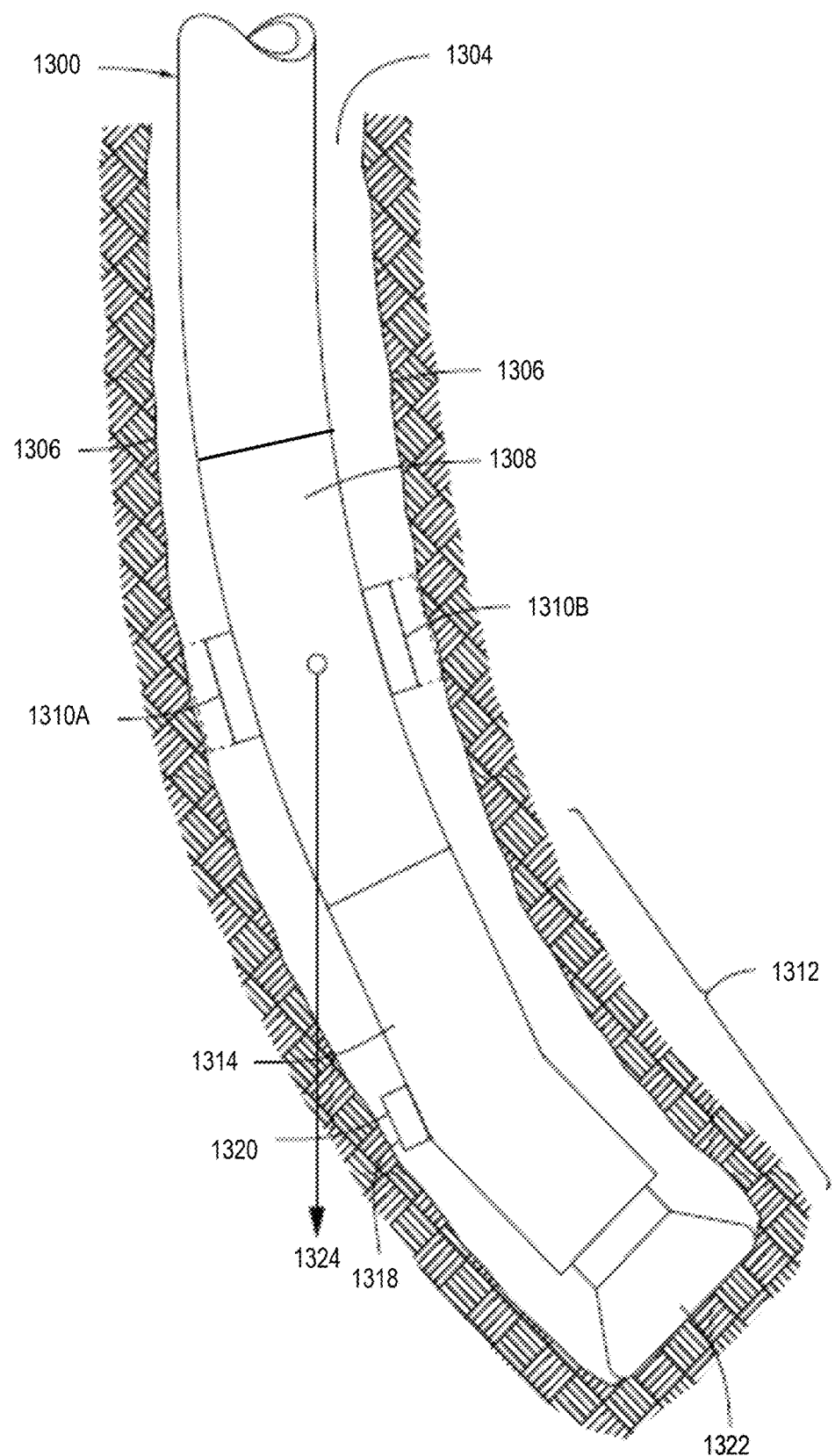
FIG. 13 is a schematic diagram an example pulsed power drill string with fixed and adjustable stabilizers and a bent housing for pulsed power directional drilling, according to some implementations.
Figure 14:
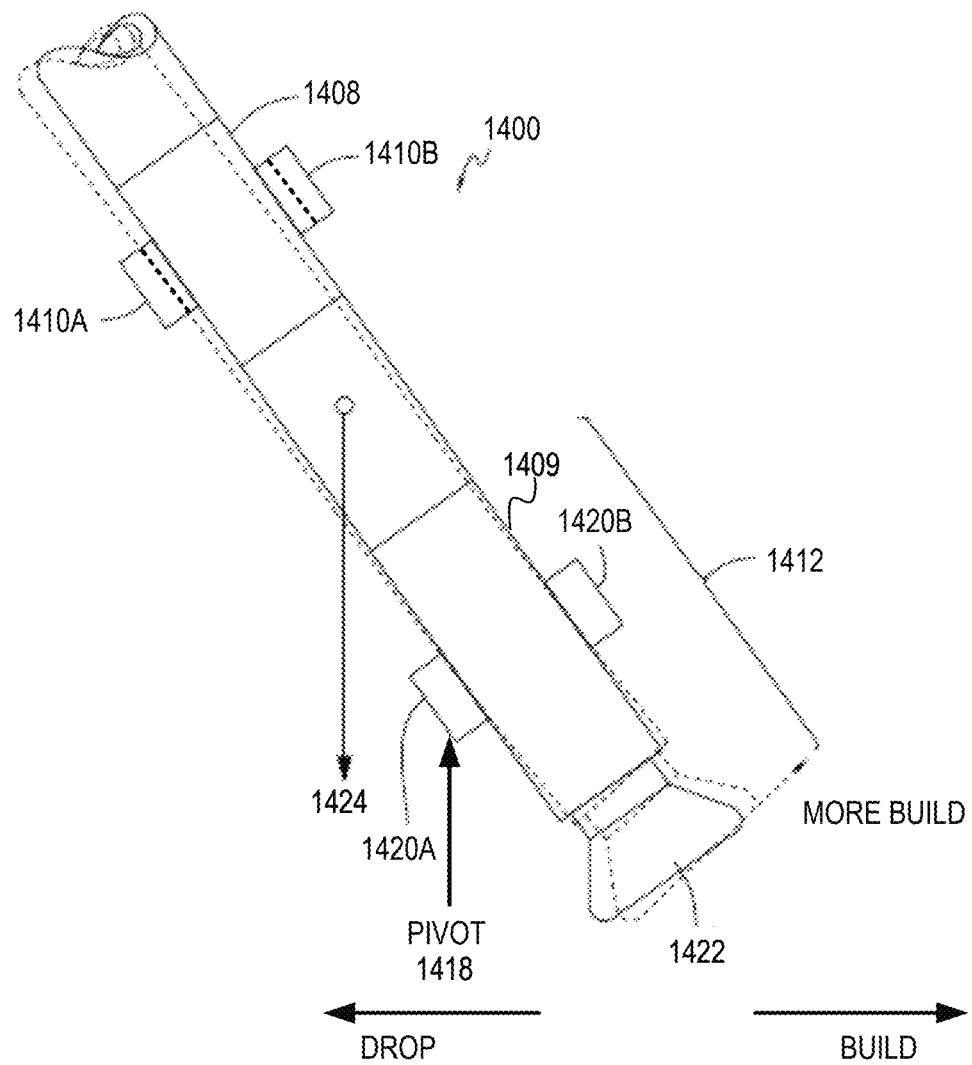
FIG. 14 is a schematic diagram an example pulsed power drill string in a fulcrum configuration with fixed and adjustable stabilizers for pulsed power directional drilling, according to some implementations.
Figure 15:
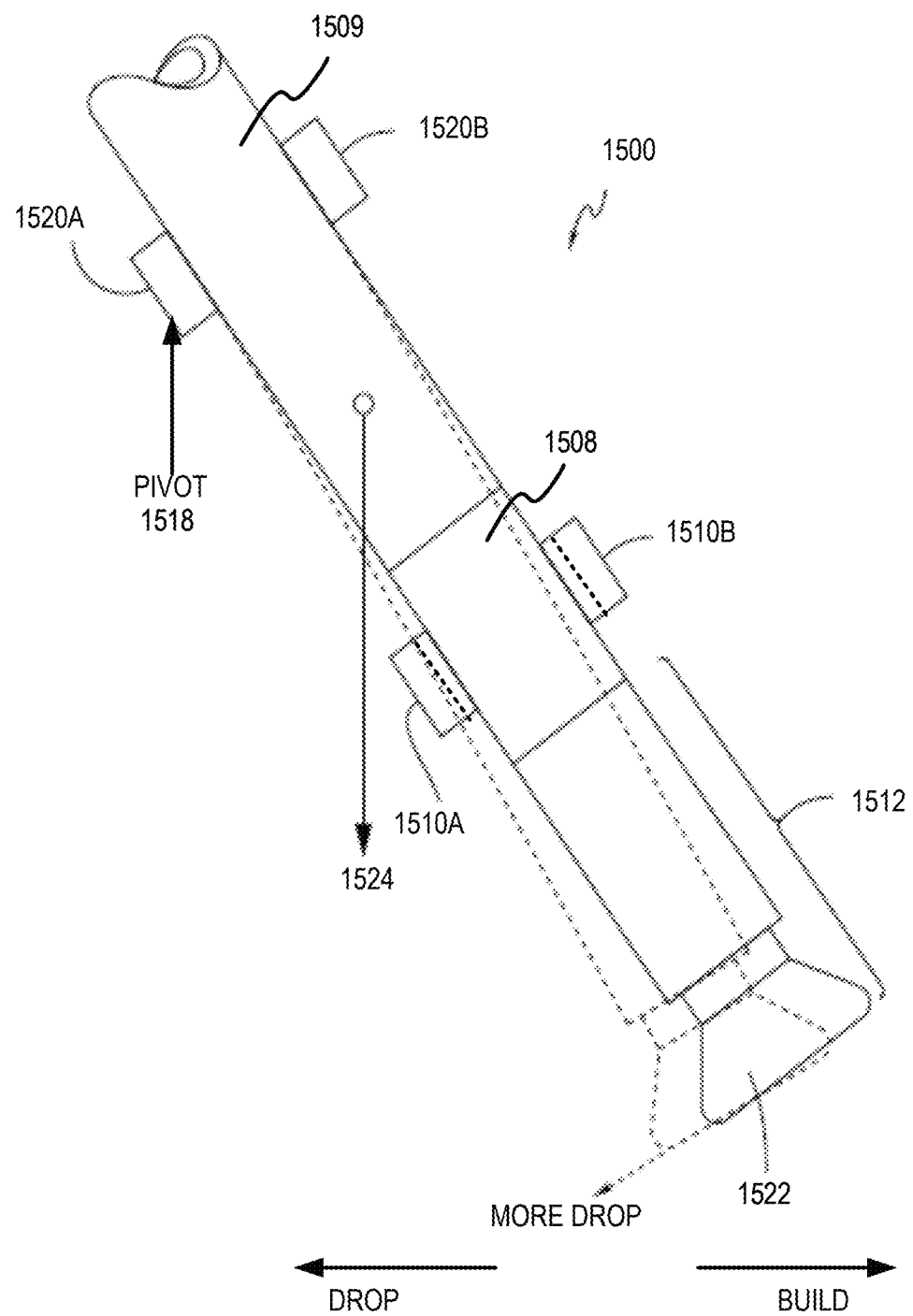
FIG. 15 is a schematic diagram an example pulsed power drill string in a pendulum configuration with fixed and adjustable stabilizers for pulsed power directional drilling, according to some implementations.

In some implementations, fixed and adjustable stabilizers and optionally a bent housing may be incorporated into the pulsed power drill string for directional drilling. FIGS. 13-15 depict three such examples.

FIG. 13 is a schematic diagram depicting an example pulsed power drill string with fixed and adjustable stabilizers and a bent housing for pulsed power directional drilling, according to some implementations. FIG. 13 depicts a pulsed power drill string 1300 positioned in a wellbore 1304 (that includes a wellbore wall 1306). The pulsed power drill string 1300 includes an adjustable stabilizer assembly 1308 positioned above a pulsed power assembly 1312. In this example, the adjustable stabilizer assembly 1308 includes one or more adjustable stabilizer blades. For this example, two stabilizer blades (1310A-B) are depicted. During downhole operations, one or both of the adjustable stabilizer blades 1310A-B may move from a closed position to an expanded position (outward to the wellbore wall 1306). This is further illustrated in FIG. 13 by the solid outline versus the dashed outline of the stabilizer blades. As shown by the solid line, there will be more build when the adjustable stabilizer blades 1310A-B are in a closed position. Conversely, there will be less build when the adjustable stabilizer blades 1310A-B are in an expanded position as shown by the dotted line.

The pulsed power assembly 1312 includes a bent housing 1313 and an electrode assembly 1322 positioned below the bent housing 1314. As shown, the bent housing 1314 is bent to cause the pulsed power drill string 1300 to directionally drill the wellbore 1304 to the right. A fixed kick pad 1320 is positioned just above the outward bend of the bent housing 1314. While FIG. 13 depicts the fixed kick pad 1320 just above the outward bend of the bent housing 1314, the fixed kick pad 1320 could be positioned at any point along the outward bend (e.g., below the outward bend, on the outward bend, further above its depicted position, etc.). As shown, the fixed kick pad 1320 may be a pivot point 1318 for the pulsed power directional drilling in this example. Also, a gravity force 1324 is the downward force being applied to the pulsed power drill string 1300 by the Earth.

FIG. 14 is a schematic diagram depicting an example pulsed power drill string in a fulcrum configuration with fixed and adjustable stabilizers for pulsed power directional drilling, according to some implementations. FIG. 14 depicts a pulsed power drill string 1400 in a fulcrum configuration. The pulsed power drill string 1400 includes an adjustable stabilizer BHA 1408 positioned above a pulsed power assembly 1412. The adjustable stabilizer BHA 1408 may include one or more stabilizer blades. In this example, the adjustable stabilizer BHA 1408 includes two adjustable stabilizer blades (1410A-B).

The pulsed power assembly 1412 includes a fixed stabilizer BHA 1409 and an electrode assembly 1422 positioned below the fixed stabilizer BHA 1409. The fixed stabilizer may include one or more fixed stabilizer blades. In this example, two fixed stabilizer blades 1420A-B are positioned on the fixed stabilizer BHA 1409. In this fulcrum configuration, the fixed stabilizer blade 1420A serves as a pivot 1418 for the pulsed power directional drilling. Also, a gravity force 1424 is the downward force being applied to the pulsed power drill string 1400 by the Earth.

During downhole operations, one or both of the adjustable stabilizer blades 1410A-B may move from a closed position to an expanded position (outward to a wall of the wellbore). There will be more build when the adjustable stabilizer blades 1410A-B are in a closed position. Conversely, there will be less build (possibly drop) when the adjustable stabilizer blades 1410A-B are in an expanded position. This is further illustrated in FIG. 14 by the solid outline versus the dashed outline of the pulsed power drill string 1400. As shown by the solid outline of the pulsed power drill string 1400, if the adjustable stabilizer blades 1410A-1410B are in an expanded position, there is less build (less rate of directional change). Conversely as shown by the dashed outline, if the adjustable stabilizer blades 1410A-1410B are in a closed position, there is more build (increased rate of directional change).

FIG. 15 is a schematic diagram depicting an example pulsed power drill string in a pendulum configuration with fixed and adjustable stabilizer blades for pulsed power directional drilling, according to some implementations. FIG. 15 depicts a pulsed power drill string 1500 in a pendulum configuration. The pulsed power drill string 1500 includes a fixed stabilizer assembly 1509 positioned above an adjustable stabilizer assembly 1508 that is positioned above a pulsed power assembly 1512. The pulsed power assembly 1512 includes an electrode assembly 1522. The fixed stabilizer assembly 1509 may include one or more stabilizer blades. In this example, the fixed stabilizer assembly 1509 includes two adjustable stabilizer blades (1520A-B). The adjustable stabilizer assembly 1508 may include one or more adjustable stabilizer blades. In this example, the adjustable stabilizer assembly 1508 includes two adjustable stabilizer blades (1510A-B).

In this pendulum configuration, the fixed stabilize blade 1520A serves as a pivot 1518 for the pulsed power directional drilling. Also, a gravity force 1524 is the downward force being applied to the pulsed power drill string 1500 by the Earth.

During downhole operations, one or both of the adjustable stabilizer blades 1510A-B may move from a closed position to an expanded position (outward to a wall of the wellbore). There will be less drop when the adjustable stabilizer blades 1510A-B are in an expanded position. Conversely, there will be more drop when the adjustable stabilizer blades 1510A-B are in a closed position. This is further illustrated in FIG. 15 by the solid outline versus the dashed outline of the pulsed power drill string 1500. As shown by the solid outline of the pulsed power drill string 1500, if the adjustable stabilizer blades 1510A-1510B are in an expanded position, there is less drop. Conversely as shown by the dashed outline, if the adjustable stabilizer blades 1510A-1510B are in a closed position, there is more drop.

In some implementations, two or more of these different directional drilling configurations described above may be combined. For example, the bent housing of FIG. 7 may be combined with the selective use of electrodes of FIG. 11. Such a combination would allow for a modified curvature of the directional change provided by the bent housing. For example, selective use of an electrode where the bent housing is angling away from the longitudinal axis of the wellbore could increase the curvature of that angling to allow for a quicker directional change. In another example, selective use of an electrode opposite of where the bent housing is angling way could decrease the curvature of that angling to allow for a more gradual directional change. Any combination of the adjustable stabilizer and bent housing configuration shown in FIGS. 13-15 may be combined with any of the configurations of FIGS. 6-12.

Example Operations

Figure 16:
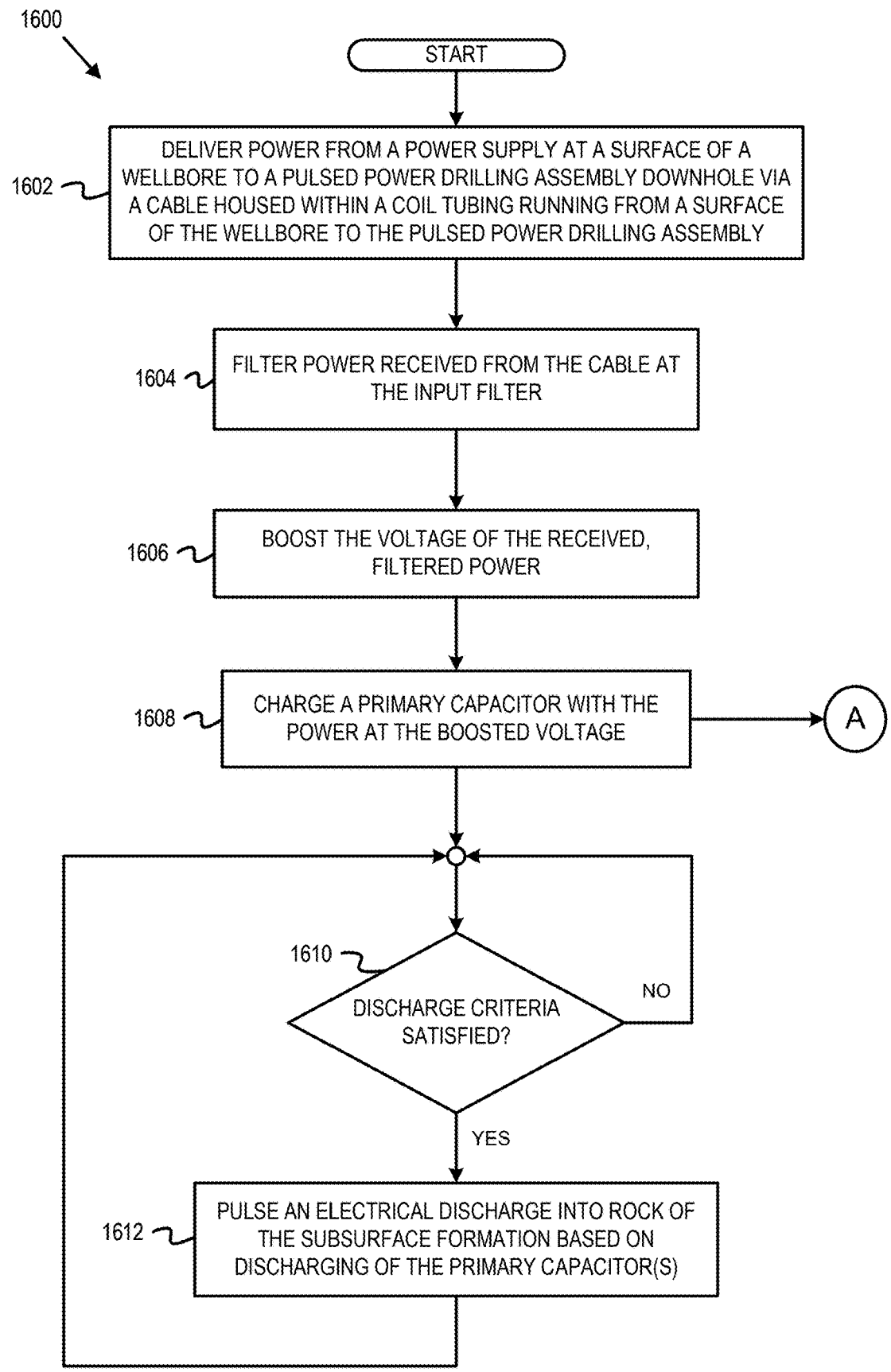
FIGS. 16-17 are flowcharts depicting example operations for pulsed power drilling, according to some implementations.
Figure 17:
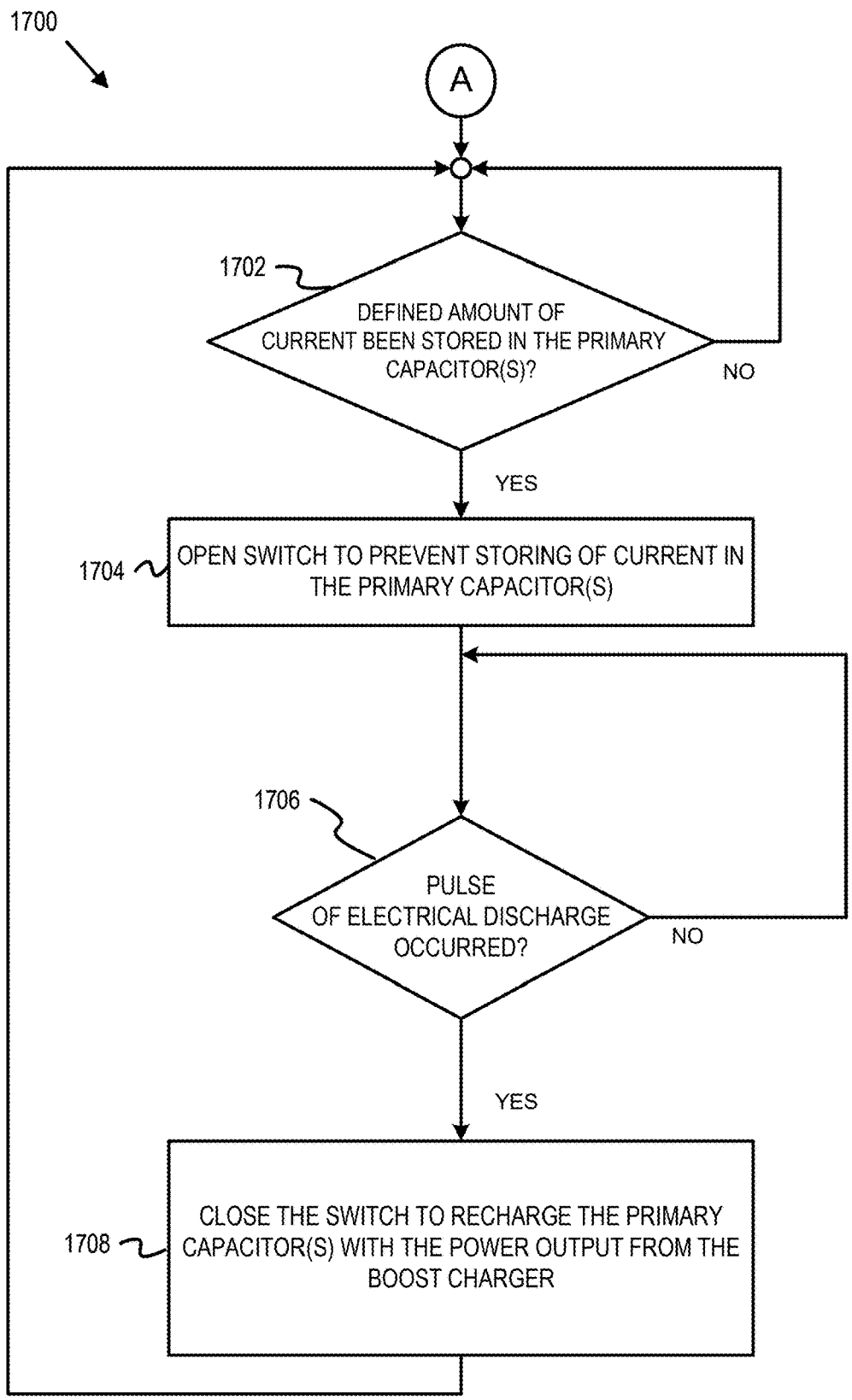
Figure 18:
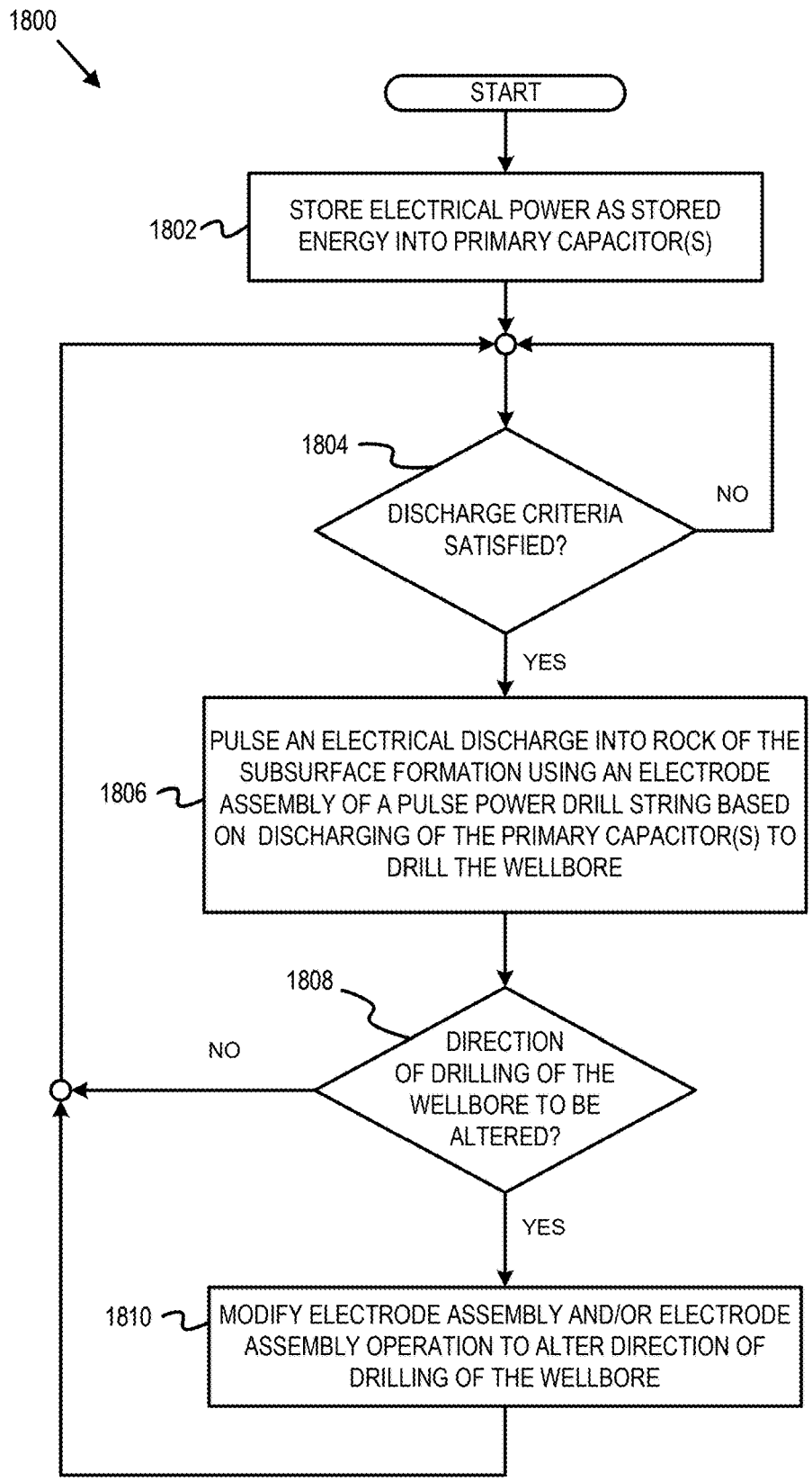
FIG. 18 is a flowchart depicting example operations for directional pulsed power drilling, according to some implementations.

Example operations for pulsed power drilling are now described in reference to FIGS. 16-18. FIGS. 16-17 depict example operations for pulsed power drilling via cable-delivered power through coiled tubing. FIG. 18 depicts example operations for directional drilling for pulsed power operations.

FIGS. 16-17 are flowcharts depicting example operations for pulsed power drilling, according to some implementations. Operations of flowcharts 1600-1700 of FIGS. 16-17 continue between each other through transition point A. Operations of the flowcharts 1600-1700 may be performed by software, firmware, hardware, or a combination thereof. Operations of the flowcharts 1600-1700 are described in reference to the example pulsed power drilling system 100 of FIG. 1, but the operations may be applicable to any pulse power system (ex. fracturing). Other systems and components may also be used to perform the operations now described. The operations of the flowchart 1600 start at block 1602.

At block 1602, power from a power supply at the surface of the wellbore is delivered to a pulsed power drilling assembly downhole via a cable housed a coiled tubing string running from the surface to the pulsed power drilling assembly. For example, with reference to FIGS. 1 and 3, the power may be delivered from the power supply 180 (or optionally, the DC power supply 302) at the surface 104 and down the wellbore 106 via the cable 116. The cable 116 may be positioned within the coiled tubing 102.

At block 1604, the received power from the cable is filtered at the input filter. For example, with reference to FIG. 1, the power received by the cable 116 may be filtered at the input filter 120. The input filter 120 may condition the received power prior to being input into the boost charger 125.

At block 1606, the received and filtered power has its voltage boosted at the boost charger. For example, with reference to FIG. 1, the boost charger 125 may boost the voltage of power output from the input filter from 3 kV to 16 kV.

At block 1608, the boosted voltage output from the boost charger is used to charge a primary capacitor. For example, with reference to FIG. 1, the boost charger 125 may be used to charge the primary capacitor(s) 136. From block 1608, operations continue at block 1610 and transition point A, which continues at transition point A of the flowchart 1700.

At block 1610, a determination is made of whether a discharge criteria is satisfied. For example, with reference to FIG. 1, the pulsed power controller 130 may determine whether one or more discharge criteria is satisfied. For example, the discharge criteria may be a criteria that a defined amount of energy has been stored in the primary capacitor(s) 136. An example may be that the primary capacitor(s) 136 are fully charged, more than a defined percent (e.g., 99%, 95%, 90%, 50%, etc.), etc. Another example criteria may be that a bottom of the drill string is in contact with a bottom of the wellbore. For example, the criteria may be that at least a minimum amount of surface area of the bottom of the drill string in in contact with a bottom of the wellbore. Another example criteria may be that a defined amount of time has elapsed since a prior pulsing of the electrical discharge. This defined amount of time may help ensure that the bottom of the drill string is in contact with a bottom of the wellbore prior to pulsing of the electrical discharge.

At block 1612, an electrical discharge is pulsed into rock of the subsurface formation based on discharging of the primary capacitor. For example, with reference to FIG. 1, in response to the discharge criteria being satisfied, the pulsed power controller 130 may cause the primary capacitor(s) 136 to release the stored energy from the primary capacitor(s) 136 through the electrodes 144—resulting in the pulsed of electrical discharge into the surrounding subsurface formation. This pulsing of the electrical discharge may continue to occur periodically in response to the discharge criteria being satisfied. Accordingly, operations of the flowchart 1600 may return to block 1610 to determine whether a discharge criteria is subsequently satisfied.

Operations of the flowchart 1700 are now described. From transition point A, operations continue at block 1702.

At block 1702, a determination is made of whether a defined amount of current has been stored in the primary capacitors. For example, with reference to FIG. 1, the pulsed power controller 130 may make this determination whether a defined amount of charge is stored in the primary capacitor(s) 136. For example, the defined amount of charge may be that the primary capacitor(s) 136 are fully charged, more than a defined percent (e.g., 99%, 95%, 90%, 50%, etc.), etc. If the defined amount of charge has not been stored, operations of the flowchart 1700 remain at block 1702 to again determine whether a defined amount of charge has been stored. If the defined amount of charge has been stored, operations of the flowchart 1700 continue at block 1704.

At block 1704, the switch is opened to prevent storing of charge in the primary capacitor. For example, with reference to FIG. 1, one or more switches in the switch bank 134 may be opened to prevent flow of charge for storage in the primary capacitor(s) 136.

At block 1706, a determination is made of whether a pulse of electrical discharge has occurred. For example, with reference to FIG. 1, the pulsed power controller 130 may make this determination because the pulsed power controller 130 may control when a pulse of the electrical discharge happens. In particular, the pulsed power controller 130 may enable the releasing of the stored energy from the primary capacitor(s) 136 through the electrodes 144—resulting in the pulse of electrical discharge into the surrounding subsurface formation. If the pulse of electrical discharge has not occurred, operations remain at block 1706 to continue to check. If the pulse of electrical discharge has occurred, operations continue at block 1708.

At block 1708, the switch is closed to recharge the primary capacitor from the power output from the boost charger. For example, with reference to FIG. 1, the pulsed power controller 130 may close a switch positioned between the boost charger 125 and the primary capacitor(s) 136. This closed position would again allow the storing of charge in the primary capacitor(s) 136. Operations return to block 1702, where a determination is made of whether the defined amount of charge has been stored.

Example operations for directional pulsed power drilling are now described. In particular, FIG. 18 is a flowchart depicting example operations for directional pulsed power drilling, according to some implementations. Operations of the flowchart 1800 may be performed by software, firmware, hardware, or a combination thereof. Operations of the flowchart 1800 are described in reference to the example pulsed power drilling system 100 of FIG. 1 and the various configurations of FIGS. 6-15. However, other systems and components may be used to perform the operations now described. The operations of the flowchart 1800 start at block 1802.

At block 1802, electrical energy is stored into primary capacitor(s). For example, with reference to FIG. 1, electrical power from the cable 116 may be filtered by the input filter 120, have its voltage boosted via the boost charger 125, and may be allowed to charge the primary capacitor(s) 136.

At block 1804, a determination is made of whether a discharge criteria is satisfied. For example, with reference to FIG. 1, the pulsed power controller 130 may determine whether one or more discharge criteria is satisfied. For example, the discharge criteria may be a criteria that a defined amount of energy has been stored in the primary capacitor(s) 136. An example may be that the primary capacitor(s) 136 are fully charged, more than a defined percent (e.g., 99%, 95%. 90%, 50%, etc.), etc. Another example criteria may be that a bottom of the drill string is in contact with a bottom of the wellbore. For example, the criteria may be that at least a minimum amount of surface area of the bottom of the drill string in in contact with a bottom of the wellbore. Another example criteria may be that a defined amount of time has elapsed since a prior pulsing of the electrical discharge. This defined amount of time may help ensure that the bottom of the drill string is in contact with a bottom of the wellbore prior to pulsing of the electrical discharge.

At block 1806, an electrical discharge is pulsed into rock of the subsurface formation using an electrode assembly of a pulsed power drill string based on discharging of the primary capacitor(s). For example, with reference to FIG. 1, in response to the discharge criteria being satisfied, the pulsed power controller 130 may cause the primary capacitor(s) 136 to release the stored energy from the primary capacitor(s) 136 through the electrodes 144—resulting in the pulse of electrical discharge into the surrounding subsurface formation. This pulsing of the electrical discharge may continue to occur periodically in response to the discharge criteria being satisfied. Additionally, one or more of the examples of the electrode assemblies depicted in FIGS. 6-12 may be used to output the electrical discharge.

At block 1808, a determination is made of whether direction of drilling of the wellbore is to be altered. This determination may be based on drilling data for the wellbore being drilled and may be made at the surface and/or downhole. For example, drilling of the wellbore may be altered based on operational parameters. Operational parameters may include any adjustable parameter that may influence drilling. For example, drilling may be altered based on a rate of penetration (ROP) for the drilling operation. Alternatively or in addition, drilling may be altered based on a property of a drilling fluid. For example, drilling may be altered based on the presence of cuttings in a drilling fluid. In some implementations, drilling data may include directional survey data and determining whether drilling of the wellbore is to be altered may be based on directional survey data. For example, directional survey data may indicate that drilling of the wellbore is proceeding in an undesired direction and it may be determined that drilling is to be altered in order to advance the wellbore in a desired direction. Optionally, directional survey data may be compared to a wellbore trajectory model for the drilling operation to determine whether the trajectory of the wellbore being drilled is desirable. Alternatively or in addition, directional survey data may be used to update a wellbore trajectory model and altering the drilling may be based on the updated wellbore trajectory model.

In some implementations, determining whether drilling is to be altered may be based on optimizing an aspect of the drilling operation. For instance, drilling of the wellbore may be altered to maximize recovery of hydrocarbons from the subsurface formation. In some implementations, data collected during drilling may be used to evaluate the formation through which the wellbore is being drilled. For example, a computer may execute instructions to perform a formation evaluation of the formations being drilled in real time to make this determination. Alternatively, or in addition, determining whether drilling is to be altered may be based on drilling data from drilling of a previous wellbore into a subsurface formation that is assumed to be similar to the subsurface formation into which the current wellbore is being drilled. For example, the previous wellbore may be proximate to the current wellbore (i.e., in the same basin). Drilling data from a previous wellbore may be used to identify which layers of the formation include recoverable hydrocarbons and their associated depths. Thus, direction of drilling of the current wellbore may be altered so that the wellbore is drilled through these layers identified as having recoverable hydrocarbons. If direction of the drilling of the wellbore is not to be altered, operations of the flowchart 1800 may return to block 1804 to determine whether a discharge criteria is satisfied. If direction of the drilling of the wellbore is to be altered, operations of the flowchart 1800 continue at block 1810.

At block 1810, the electrode assembly and/or the electrode assembly operation is modified to alter direction of drilling of the wellbore. For example, one or more of the examples of modification of a pulsed power drill string and/or its operation described above in reference to FIGS. 6-15 may be performed to alter direction of drilling of the wellbore. For example, drilling direction may be altered by replacing a current electrode assembly (without a bent housing) by the electrode assembly having a bent housing (as described above in reference to FIG. 6). Alternatively or in addition, drilling direction may be altered by adjusting an adjustable ground ring of the electrode assembly (as described above in reference to FIG. 7). Alternatively or in addition, drilling direction may be altered by adjusting an adjustable electrode face (as described above in reference to FIGS. 8 and/or 9). Alternatively or in addition, drilling direction may be altered by selecting which electrodes are to be used for output of the electrical energy and/or amount of energy allocated to selected electrodes (as described above in reference to FIG. 10). Alternatively or in addition, drilling direction may be altered by selecting which segments of a multi-segmented ground ring are configured to provide an electrical return path (as described above in reference to FIG. 12). Accordingly, any combination of these modifications may be used to alter drilling direction. For example, an electrode assembly with a bent housing (FIG. 6) may also include selectable electrodes and/or amount of energy for each selected electrode (FIG. 10). Operations of the flowchart 1800 return to block 1804 to determine whether a discharge criteria is satisfied for the next pulse of electrical discharge. Operations of the flowchart 1800 may continue until drilling operations of the wellbore are stopped and/or complete.

The flowcharts are provided to aid in understanding the illustrations and are not to be used to limit the scope of the claims. The flowcharts depict example operations that may vary within the scope of the claims. Additional operations may be performed; fewer operations may be performed; the operations may be performed in parallel; and the operations may be performed in a different order. For example, the operations depicted in blocks 1602-1610 may be performed at least partially in parallel or concurrently. It will be understood that each block of the flowchart illustrations and/or block diagrams, and combinations of blocks in the flowchart illustrations and/or block diagrams, may be implemented by program code. The program code may be provided to a processor of a general purpose computer, special purpose computer, or other programmable machine or apparatus.

As will be appreciated, aspects of the disclosure may be implemented as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations may be organized differently in accordance with any one of platform (operating system and/or hardware), application ecosystem, interfaces, programmer preferences, programming language, administrator preferences, etc.

While the aspects of the disclosure are described with reference to various implementations and exploitations, it will be understood that these aspects are illustrative and that the scope of the claims is not limited to them. In general, techniques for pulsed power drilling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

Example Implementations

Example implementations include the following:

Implementation #1: A system comprising: at least one coiled tubing extending from a surface of a wellbore to a bottomhole assembly (BHA); a power cable to be housed either inside or outside the at least one coiled tubing and to electrically couple a power supply at the surface of the wellbore with the BHA; and the BHA comprising, at least one capacitor to store electrical power received from the power supply via the power cable housed in the at least one coiled tubing; and at least one electrode electrically coupled to the at least one capacitor to receive the stored electrical power from the at least one capacitor and to periodically emit pulsed power discharges into a subsurface formation to drill the wellbore based on the stored electrical power received from the at least one capacitor.

Implementation #2: The system of Implementation 1, wherein the at least one coiled tubing is configured to convey a drilling fluid from the surface of the wellbore to downhole.

Implementation #3: The system of any one or more of Implementations 1-2, wherein the electrical power comprises direct current (DC) power, wherein the BHA comprises, a boost charger to increase a voltage of the DC power received from the power supply via the power cable at least partially in parallel with storage of the DC power in the at least one capacitor.

Implementation #4: The system of any one or more of Implementations 1-3, further comprising: a switch positioned between the boost charger and the at least one capacitor, wherein the switch is configured to, open to stop storage of electrical charge into the at least one capacitor in response to a determination that the at least one capacitor is charged.

Implementation #5: The system of any one or more of Implementations 1-4, wherein, in response to a periodic pulsed power discharge, the switch is configured to close to enable storage of the electrical charge into the at least one capacitor.

Implementation #6: The system of any one or more of Implementations 1-5, wherein the boost charger comprises a voltage booster that is configured to increase the voltage of the DC power.

Implementation #7: The system of any one or more of Implementations 1-6, wherein the boost charger comprises a multi-mode capacitor charger configured to switch between a constant power mode and constant current mode based, at least in part, on a load property of the power supply or the at least one capacitor.

Implementation #8: The system of any one or more of Implementations 1-7, wherein the BHA comprises an input filter configured to filter the electrical power prior to being increased by the boost charger.

Implementation #9: The system of any one or more of Implementations 1-8, wherein the input filter configured to filter the electrical power comprises the input filter to perform at least one of a reduction of ripple voltage components, a removal of resonant frequencies, or a smoothening of current and voltage waveforms.

Implementation #10: The system of any one or more of Implementations 1-9, further comprising at least one of a fiber optic cable or a coaxial communication cable to be housed in the at least one coiled tubing.

Implementation #11: A pulsed power drilling apparatus configured to extend a wellbore formed in a subsurface formation, the pulsed power drilling apparatus comprising: a bottomhole assembly (BHA) to be positioned in the wellbore and coupled to at least one coiled tubing extending from a surface of the wellbore, wherein the at least one coiled tubing is to house a power cable running from a power supply at the surface of the wellbore to the BHA to supply electrical power from the power supply to the BHA, the BHA comprising: at least one capacitor to store the electrical power; and at least one electrode electrically coupled to the at least one capacitor to receive the stored electrical power from the at least one capacitor and to periodically emit pulsed power discharges into the subsurface formation to drill the wellbore based on the stored electrical power received from the at least one capacitor.

Implementation #12: The pulsed power drilling apparatus of Implementation 11, wherein the at least one coiled tubing is configured to convey a drilling fluid from the surface of the wellbore to downhole.

Implementation #13: The pulsed power drilling apparatus of any one or more of Implementations 11-12, wherein the electrical power comprises direct current (DC) power, wherein the BHA comprises, a boost charger to increase a voltage of the DC power received from the power supply via the power cable at least partially in parallel with storage of the DC power in the at least one capacitor, wherein the boost charger comprises a voltage booster that is configured to increase the voltage of the DC power.

Implementation #14: The pulsed power drilling apparatus of any one or more of Implementations 11-13, wherein the boost charger comprises a multi-mode capacitor charger configured to switch between a constant power mode and constant current mode based, at least in part, on a load property of the power supply or the at least one capacitor.

Implementation #15: The pulsed power drilling apparatus of any one or more of Implementations 11-14, wherein the BHA comprises an input filter configured to filter the electrical power prior to being increased by the boost charger, wherein the input filter configured to filter the electrical power comprises the input filter to perform at least one of a reduction of ripple voltage components, a removal of resonant frequencies, or a smoothening of current and voltage waveforms.

Implementation #16: A method comprising: electrically coupling a power supply at a surface of a wellbore to a pulsed power drilling apparatus via a power cable that is housed in a coiled tubing that runs from the surface of the wellbore to the pulsed power drilling apparatus to be positioned downhole in the wellbore; supplying electrical power from the power supply to the pulsed power drilling apparatus positioned downhole in the wellbore, via the power cable that is housed in the coiled tubing; and performing a pulsed power drilling of the wellbore using the pulsed power drilling apparatus, the pulsed power drilling comprising, storing the electrical power from the power supply into at least one capacitor of the pulsed power drilling apparatus; and periodically pulsing an electrical discharge from at least one electrode into a subsurface formation surrounding the wellbore based on the electrical power stored in the at least one capacitor.

Implementation #17: The method of Implementation 16, further comprising: supplying a drilling fluid through the coiled tubing the pulsed power drilling apparatus during the pulsed power drilling.

Implementation #18: The method of any one or more of Implementations 16-17, wherein the electrical power comprises a direct current (DC) electrical power, wherein the method further comprises: boosting, via a voltage booster of the pulsed power drilling apparatus, the DC electrical power to a higher voltage at least partially in parallel with storing the DC electrical power into the at least one capacitor; outputting, from the voltage booster, the DC power at the higher voltage to a multi-mode capacitor charger of the pulsed power drilling apparatus; and storing, via the multi-mode capacitor charger, the DC electrical power into the at least one capacitor.

Implementation #19: The method of any one or more of Implementations 16-18, wherein boosting the DC electrical power and charging the at least one capacitor occurs, at least partially, in parallel.

Implementation #20: The method of any one or more of Implementations 16-19, further comprising: switching, via the multi-mode capacitor charger, between a constant power mode and constant current mode based, at least in part, on load properties of the power supply and the at least one capacitor.

What is claimed is:
1. A system comprising:
at least one coiled tubing extending from a surface of a wellbore to a bottomhole assembly (BHA), wherein the BHA comprises,
a voltage booster configured to increase a voltage of electrical power received via a power supply positioned at the surface of the wellbore for pulsed power drilling; and
a multi-mode capacitor charger configured to switch between a constant power mode and a constant current mode to charge at least one capacitor based, at least in part, on a charge time of the at least one capacitor.

2. The system of claim 1, wherein the at least one coiled tubing is configured to convey a drilling fluid from the surface of the wellbore to downhole.

3. The system of claim 1, further comprising:
a power cable to be housed either inside or outside the at least one coiled tubing and to electrically couple the power supply at the surface of the wellbore with the BHA, wherein the BHA further comprises:
a boost charger including the voltage booster;
the at least one capacitor, wherein the at least one capacitor is configured to store electrical power received from the power supply via the power cable housed via the at least one coiled tubing; and
at least one electrode electrically coupled to the at least one capacitor to receive the stored electrical power from the at least one capacitor and to periodically emit pulsed power discharges into a subsurface formation to drill the wellbore based on the stored electrical power received from the at least one capacitor,
wherein the electrical power received via the power supply comprises direct current (DC) power, and
wherein the boost charger is configured to increase a voltage of the DC power received from the power supply via the power cable at least partially in parallel with storage of the electrical power in the at least one capacitor of the BHA.

4. The system of claim 3, further comprising:
a switch positioned between the boost charger and the at least one capacitor, wherein the switch is configured to, open to stop storage of electrical charge into the at least one capacitor in response to a determination that the at least one capacitor is charged.

5. The system of claim 4, wherein, in response to a periodic pulsed power discharge, the switch is configured to close to enable storage of the electrical charge into the at least one capacitor.

6. The system of claim 3, wherein the voltage booster is configured to increase the voltage of the DC power.

7. The system of claim 3, wherein the boost charger includes the multi-mode capacitor charger, and wherein the multi-mode capacitor charger is configured to switch between the constant power mode and the constant current mode based, at least in part, on a load property of the power supply or the at least one capacitor.

8. The system of claim 3, wherein the BHA comprises an input filter configured to filter the electrical power prior to being increased by the boost charger.

9. The system of claim 8, wherein the input filter is configured to perform at least one of a reduction of ripple voltage components, a removal of resonant frequencies, or a smoothening of current and voltage waveforms in the electrical power.

10. The system of claim 1, further comprising at least one of a fiber optic cable or a coaxial communication cable to be housed in the at least one coiled tubing.

11. A pulsed power drilling apparatus configured to extend a wellbore formed in a subsurface formation, the pulsed power drilling apparatus comprising:
a bottomhole assembly (BHA) to be positioned in the wellbore the BHA comprising:
a voltage booster configured to increase a voltage of electrical power received via a power supply positioned at a surface of the wellbore for pulsed power drilling; and
a multi-mode capacitor charger configured to switch between a constant power mode and a constant current mode to charge at least one capacitor based, at least in part, on a charge time of the at least one capacitor.

12. The pulsed power drilling apparatus of claim 11, wherein the BHA is coupled to at least one coiled tubing extending from the surface of the wellbore, and wherein the at least one coiled tubing is configured to convey a drilling fluid from the surface of the wellbore to downhole.

13. The pulsed power drilling apparatus of claim 11, further comprising:
a power cable to be housed and coupled to at least one coiled tubing extending from the surface of the wellbore, wherein the power cable is configured to run from the power supply at the surface of the wellbore to the BHA to supply electrical power from the power supply to the BHA,
wherein the BHA further comprises,
a boost charger including the voltage booster;
the at least one capacitor, wherein the at least one capacitor is configured to store the electrical power; and
at least one electrode electrically coupled to the at least one capacitor to receive the stored electrical power from the at least one capacitor and to periodically emit pulsed power discharges into the subsurface formation to drill the wellbore based on the stored electrical power received from the at least one capacitor,
wherein the electrical power received via the power supply comprises direct current (DC) power, and
wherein the boost charger is configured to increase a voltage of the DC power received from the power supply via the power cable at least partially in parallel with storage of the DC power in the at least one capacitor.

14. The pulsed power drilling apparatus of claim 13, wherein the boost charger includes the multi-mode capacitor charger, and wherein the multi-mode capacitor charger is configured to switch between the constant power mode and the constant current mode based, at least in part, on a load property of the power supply or the at least one capacitor.

15. The pulsed power drilling apparatus of claim 13, wherein the BHA comprises an input filter configured to filter the electrical power prior to being increased by the boost charger, wherein the input filter is configured to perform at least one of a reduction of ripple voltage components, a removal of resonant frequencies, or a smoothening of current and voltage waveforms in the electrical power.

16. A method comprising:
performing a pulsed power drilling of a wellbore using a pulsed power drilling apparatus, the pulsed power drilling comprising,
boosting, via a voltage booster of the pulsed power drilling apparatus, electrical power received from a power supply at a surface of the wellbore to a higher voltage;
charging, via a multi-mode capacitor charger configured to switch between a constant power mode and a constant current mode, at least one capacitor of the pulsed power drilling apparatus, wherein the multi-mode capacitor charger is configured to switch between the constant power mode and the constant current mode based, at least in part, on a charge time of the at least one capacitor; and
storing the electrical power at the higher voltage into the at least one capacitor of the pulsed power drilling apparatus.

17. The method of claim 16, further comprising:
supplying a drilling fluid through a coiled tubing of the pulsed power drilling apparatus during the pulsed power drilling;
electrically coupling the power supply at the surface of the wellbore to the pulsed power drilling apparatus via a power cable that is housed in the coiled tubing that runs from the surface of the wellbore to the pulsed power drilling apparatus, the pulsed power drilling apparatus to be positioned downhole in the wellbore;
supplying the electrical power from the power supply to the pulsed power drilling apparatus via the power cable housed in the coiled tubing; and
periodically pulsing an electrical discharge from at least one electrode into a subsurface formation surrounding the wellbore based on the electrical power stored in the at least one capacitor.

18. The method of claim 16, wherein the electrical power comprises direct current (DC) electrical power, and wherein the method further comprises:
boosting, via the voltage booster of the pulsed power drilling apparatus, the DC electrical power to the higher voltage at least partially in parallel with storing the DC electrical power into the at least one capacitor;
outputting, from the voltage booster, the DC power at the higher voltage to the multi-mode capacitor charger; and
storing, via the multi-mode capacitor charger, the DC electrical power into the at least one capacitor.

19. The method of claim 16, wherein the boosting of the electrical power received from the power supply is performed at least partially in parallel with the storing of the electrical power into the at least one capacitor of the pulsed power drilling apparatus.

20. The method of claim 18, further comprising:
switching, via the multi-mode capacitor charger, between the constant power mode and the constant current mode based, at least in part, on a load property of the power supply or the at least one capacitor.

* * * * *